US010146359B2

(12) United States Patent
Tang et al.

(10) Patent No.: US 10,146,359 B2
(45) Date of Patent: Dec. 4, 2018

(54) COMMON ELECTRODE AUTO-COMPENSATION METHOD

(71) Applicant: Apple Inc., Cupertino, CA (US)

(72) Inventors: Howard Tang, San Diego, CA (US); Christoph H. Krah, Cupertino, CA (US); Paolo Sacchetto, Cupertino, CA (US); Chaohao Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/089,432

(22) Filed: Apr. 1, 2016

(65) Prior Publication Data

US 2016/0320898 A1 Nov. 3, 2016

Related U.S. Application Data

(60) Provisional application No. 62/154,052, filed on Apr. 28, 2015.

(51) Int. Cl.
*G06F 3/041* (2006.01)
*G06F 3/044* (2006.01)
(Continued)

(52) U.S. Cl.
CPC ........ *G06F 3/0416* (2013.01); *G02F 1/13338* (2013.01); *G06F 3/044* (2013.01);
(Continued)

(58) Field of Classification Search
CPC .... G06F 3/0416; G06F 3/0412; G06F 3/0418; G06F 3/044; G02F 1/13338; G09G 3/00
See application file for complete search history.

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

CN 1202254 A 12/1998
CN 2012-18943 Y 4/2009
(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Mark Edwards
(74) *Attorney, Agent, or Firm* — Morrison & Foerster LLP

(57) ABSTRACT

A system is disclosed. The system can comprise dynamic drive circuitry configured to drive a plurality of electrodes on a touch screen. The system can also comprise a switching circuit configured to selectively couple the dynamic drive circuitry to one or more of the plurality of electrodes. The system can also comprise a display circuitry configured to selectively update a plurality of display pixels on the touch screen. The dynamic drive circuitry can be configured to set its output based on which of the plurality of electrodes are selectively coupled to the first drive circuitry and which of the display pixels are updated by the display circuitry.

23 Claims, 10 Drawing Sheets

(51) Int. Cl.
  *G02F 1/1333* (2006.01)
  *G09G 3/00* (2006.01)
(52) U.S. Cl.
  CPC .......... *G06F 3/0412* (2013.01); *G06F 3/0418* (2013.01); *G09G 3/00* (2013.01)

(56) References Cited

U.S. PATENT DOCUMENTS

| | | |
|---|---|---|
| 5,825,352 A | 10/1998 | Bisset et al. |
| 5,835,079 A | 11/1998 | Shieh |
| 5,847,690 A | 12/1998 | Boie et al. |
| 5,880,411 A | 3/1999 | Gillespie et al. |
| 5,889,236 A | 3/1999 | Gillespie et al. |
| 5,914,465 A | 6/1999 | Allen et al. |
| 6,188,391 B1 | 2/2001 | Seely et al. |
| 6,204,897 B1 | 3/2001 | Colgan et al. |
| 6,310,610 B1 | 10/2001 | Beaton et al. |
| 6,323,846 B1 | 11/2001 | Westerman et al. |
| 6,587,358 B1 | 7/2003 | Yasumura |
| 6,690,387 B2 | 2/2004 | Zimmerman et al. |
| 6,847,354 B2 | 1/2005 | Vranish |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 7,898,122 B2 | 3/2011 | Andrieux et al. |
| 8,355,887 B1 | 1/2013 | Harding et al. |
| 8,479,122 B2 | 7/2013 | Hotelling et al. |
| 8,665,237 B2 | 3/2014 | Koshiyama et al. |
| 8,766,950 B1 | 7/2014 | Morein et al. |
| 8,773,351 B2 | 7/2014 | Rekimoto |
| 8,917,256 B2 | 12/2014 | Roziere |
| 9,000,782 B2 | 4/2015 | Roziere |
| 9,151,791 B2 | 10/2015 | Roziere |
| 9,250,757 B2 | 2/2016 | Roziere |
| 9,442,330 B2 | 9/2016 | Huo |
| 9,535,547 B2 | 1/2017 | Roziere |
| 9,640,991 B2 | 5/2017 | Blondin et al. |
| 10,007,388 B2 | 6/2018 | Roziere |
| 2002/0015024 A1 | 2/2002 | Westerman et al. |
| 2003/0075427 A1 | 4/2003 | Caldwell |
| 2004/0243747 A1 | 12/2004 | Rekimoto |
| 2005/0219228 A1 | 10/2005 | Alameh et al. |
| 2006/0161871 A1 | 7/2006 | Hotelling et al. |
| 2006/0197753 A1 | 9/2006 | Hotelling |
| 2008/0012835 A1 | 1/2008 | Rimon et al. |
| 2008/0042985 A1 | 2/2008 | Katsuhito et al. |
| 2008/0062148 A1 | 3/2008 | Hotelling et al. |
| 2008/0100572 A1 | 5/2008 | Boillot |
| 2008/0174321 A1 | 7/2008 | Kang et al. |
| 2008/0024649 A1 | 10/2008 | Hristov et al. |
| 2008/0303770 A1 | 12/2008 | Oke et al. |
| 2009/0091546 A1 | 4/2009 | Joo et al. |
| 2009/0141046 A1 | 6/2009 | Rathnam et al. |
| 2009/0174686 A1 | 7/2009 | Jeon et al. |
| 2009/0179868 A1 | 7/2009 | Ayres et al. |
| 2009/0212642 A1 | 8/2009 | Krah |
| 2009/0238012 A1* | 9/2009 | Tatapudi ................ G11C 5/063 365/189.011 |
| 2009/0309851 A1 | 12/2009 | Bernstein |
| 2010/0004029 A1 | 1/2010 | Kim |
| 2010/0019779 A1 | 1/2010 | Kato et al. |
| 2010/0031174 A1 | 2/2010 | Kim |
| 2010/0090964 A1 | 4/2010 | Soo et al. |
| 2010/0097346 A1 | 4/2010 | Sleeman |
| 2010/0123667 A1 | 5/2010 | Kim et al. |
| 2010/0139991 A1 | 6/2010 | Philipp |
| 2010/0149127 A1 | 6/2010 | Fisher et al. |
| 2010/0182018 A1 | 7/2010 | Hazelden |
| 2010/0201635 A1 | 8/2010 | Klinghult et al. |
| 2010/0328262 A1 | 12/2010 | Huang et al. |
| 2011/0001491 A1 | 1/2011 | Huang et al. |
| 2011/0007021 A1 | 1/2011 | Bernstein et al. |
| 2011/0007030 A1 | 1/2011 | Mo et al. |
| 2011/0061949 A1 | 3/2011 | Krah et al. |
| 2011/0080391 A1 | 4/2011 | Brown et al. |
| 2012/0182251 A1 | 7/2012 | Krah |
| 2012/0187965 A1 | 7/2012 | Roziere |
| 2013/0106755 A1 | 5/2013 | Hotelling et al. |
| 2013/0194231 A1 | 8/2013 | Smith et al. |
| 2013/0314393 A1 | 11/2013 | Min et al. |
| 2013/0328795 A1 | 12/2013 | Yao et al. |
| 2013/0342431 A1 | 12/2013 | Saeedi et al. |
| 2013/0342479 A1 | 12/2013 | Pyo et al. |
| 2014/0028535 A1 | 1/2014 | Min et al. |
| 2014/0070823 A1 | 3/2014 | Roziere |
| 2014/0078097 A1 | 3/2014 | Shepelev et al. |
| 2014/0111496 A1* | 4/2014 | Gomez ................ G09G 3/3696 345/212 |
| 2014/0132534 A1 | 5/2014 | Kim |
| 2014/0267165 A1 | 9/2014 | Roziere |
| 2015/0277648 A1* | 10/2015 | Small ..................... G06F 3/0416 345/174 |
| 2016/0034102 A1 | 2/2016 | Roziere et al. |
| 2016/0170533 A1 | 6/2016 | Roziere |
| 2016/0211808 A1* | 7/2016 | Lee ......................... H03F 1/301 |
| 2017/0108968 A1 | 4/2017 | Roziere |
| 2017/0220156 A1 | 8/2017 | Blondin |
| 2017/0315646 A1 | 11/2017 | Roziere |
| 2017/0351378 A1 | 12/2017 | Wang et al. |

FOREIGN PATENT DOCUMENTS

| | | |
|---|---|---|
| DE | 11-2012 004912 T5 | 8/2014 |
| EP | 2 144 146 A1 | 1/2010 |
| EP | 2 148 264 A2 | 1/2010 |
| EP | 2 224 277 A1 | 9/2010 |
| FR | 2756048 A1 | 5/1998 |
| FR | 2 896 595 A1 | 7/2007 |
| FR | 3 004 551 A1 | 10/2014 |
| JP | 2000-163031 A | 6/2000 |
| JP | 2002-342033 A | 11/2002 |
| JP | 2004-526265 A | 8/2004 |
| JP | 2006-251927 A | 9/2006 |
| JP | 2008-117371 A | 5/2008 |
| JP | 2009-086240 A | 4/2009 |
| JP | 2009-157373 A | 7/2009 |
| JP | 2013-109095 A | 6/2013 |
| KR | 10-2008-0041278 A | 5/2008 |
| KR | 10-2011-0044670 A | 4/2011 |
| WO | WO-2006/126703 A2 | 11/2006 |
| WO | WO-2007/146780 A2 | 12/2007 |
| WO | WO-2008/000964 A1 | 1/2008 |
| WO | WO-2008/030780 A1 | 3/2008 |
| WO | WO-2011/015795 A2 | 2/2011 |
| WO | WO-2011/015795 A3 | 2/2011 |
| WO | WO-2013/093327 A1 | 6/2013 |
| WO | WO-2016/066282 A1 | 5/2016 |
| WO | WO-2016/072983 A1 | 5/2016 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report dated Mar. 3, 2015, for PCT Application No. PCT/US/2014/064120, two pages.

* cited by examiner

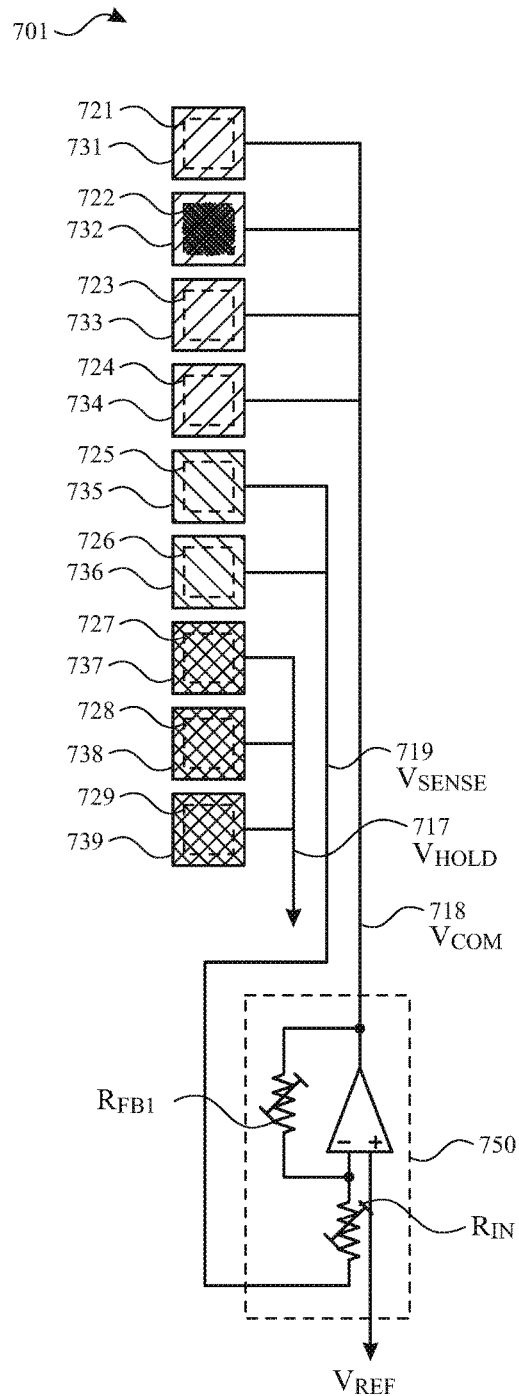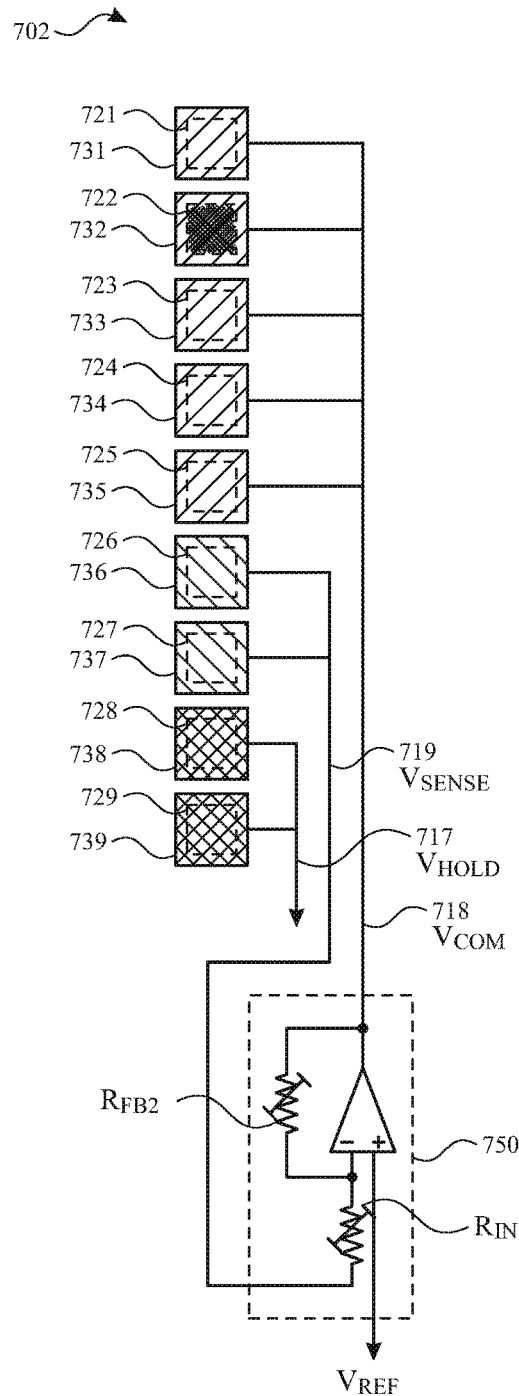
*FIG. 7A*  *FIG. 7B*

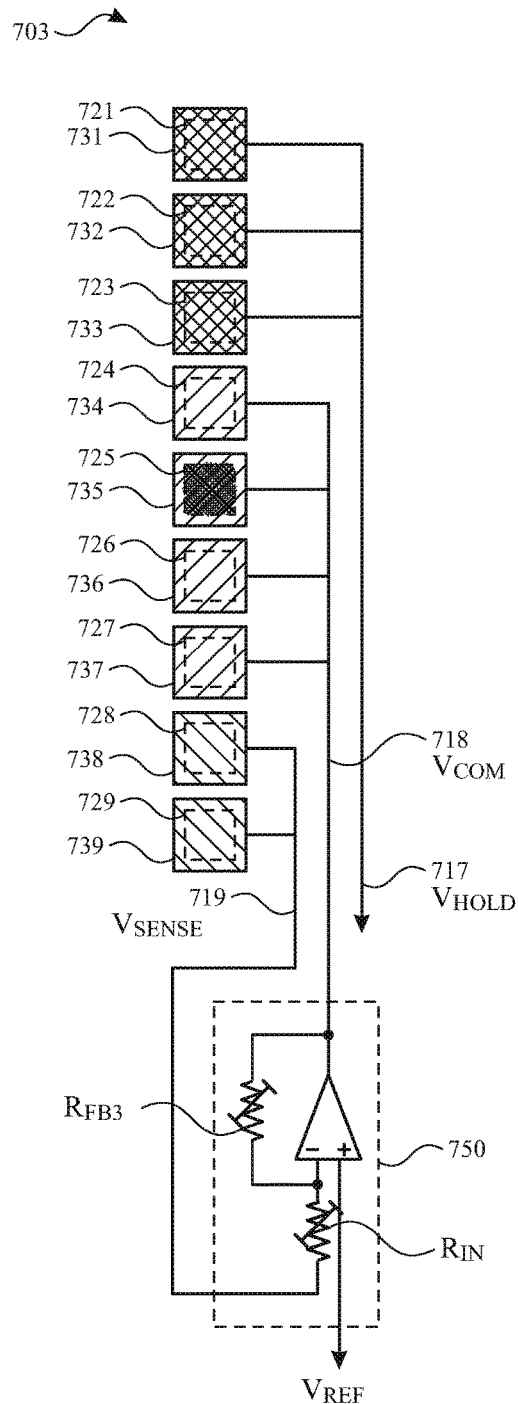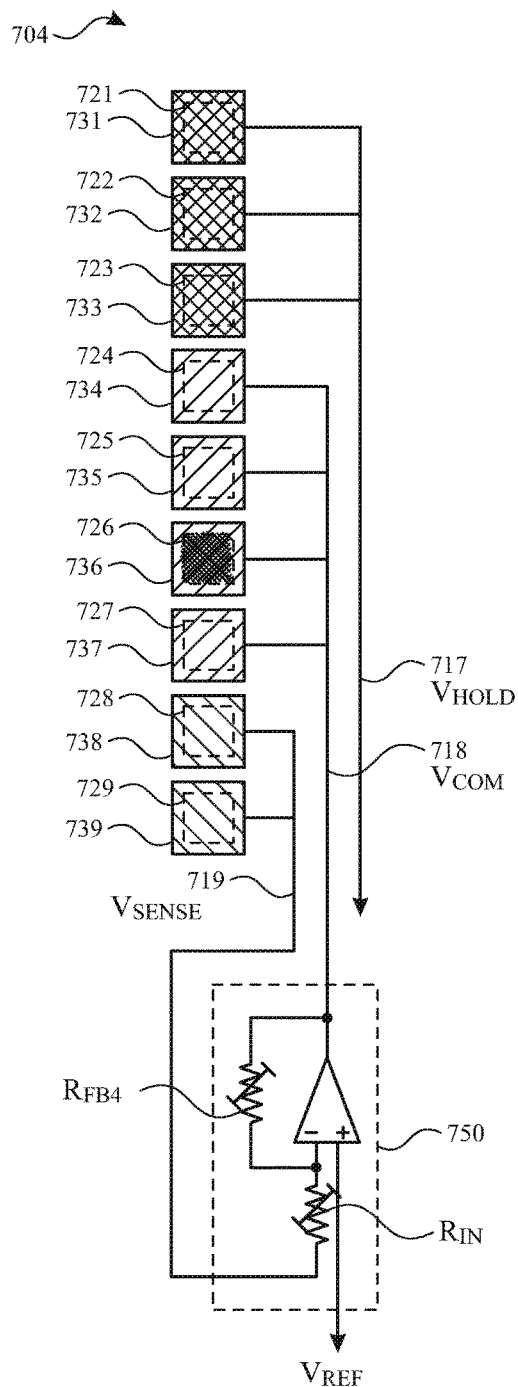
*FIG. 7C*      *FIG. 7D*

COMMON ELECTRODE AUTO-COMPENSATION METHOD

CROSS REFERENCE TO RELATED APPLICATION

This application claims the benefit under 35 U.S.C. § 119(e) of U.S. Provisional Patent Application No. 62/154,052, filed Apr. 28, 2015, the content of which is incorporated by reference herein in its entirety for all purposes.

FIELD OF THE DISCLOSURE

This relates generally to touch sensor panels, and more particularly, to a driving circuit for a touch sensor panel with a dynamic output.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of transparent or partially transparent conductive plates made of materials such as Indium Tin Oxide (ITO). It is due in part to their transparency that capacitive touch sensor panels can be overlaid on a display to form a touch screen, as described above. Some touch screens can be formed by partially integrating touch sensing circuitry into a display pixel stackup (i.e., the stacked material layers forming the display pixels).

SUMMARY OF THE DISCLOSURE

Some capacitive touch sensor panels can be formed by a matrix of transparent or partially transparent conductive plates made of materials such as Indium Tin Oxide (ITO), and some touch screens can be formed by partially integrating touch sensing circuitry into a display pixel stackup (i.e., the stacked material layers forming the display pixels). In some examples, common electrodes on the touch screen can serve as touch sensing circuitry during a touch sensing phase of the touch screen, and can serve as display circuitry during a display phase of the touch screen. During the display phase, the common electrodes may be driven to a reference voltage while display pixels are updated or scanned. In some examples, one driving circuit can drive multiple common electrodes. In some examples, the driving circuit can be selectively coupled to one or more of the multiple common electrodes to be driven. In certain circumstances, the voltage(s) on the common electrodes can be disturbed from the reference voltage (e.g., as a result of voltage changes on other touch screen components that may be in proximity to, or otherwise capacitively coupled to, the common electrodes). The time that it can take for the driving circuit to reestablish the voltage on the common electrodes to the reference voltage (e.g., the settling time) can be affected by how well the output of the driving circuit is optimized for the resistance and the capacitance presented at the output of the driving circuit—for example, the resistance and capacitance presented to the driving circuit by the common electrodes. Because the driving circuit can be selectively coupled to different common electrodes during different periods of touch screen operation, and because different display pixels can be updated or scanned during those periods, the resistance and capacitance presented at the output of the driving circuit can vary. Therefore, it can be beneficial to dynamically adjust the output of the driving circuit (i.e., utilize "dynamic driving circuits") such that it is optimized for the resistance and capacitance presented at the output of the driving circuit.

BRIEF DESCRIPTION OF THE DRAWINGS

FIGS. 7A-7D illustrate simplified circuit diagrams of a touch screen system in various LCD updating configurations and electrode coupling configurations according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of transparent or partially transparent conductive plates made of materials such as Indium Tin Oxide (no), and some touch screens can be formed by partially integrating touch sensing circuitry into a display pixel stackup (i.e., the stacked material layers forming the display pixels). In some examples, common electrodes on the touch screen can serve as touch sensing circuitry during a touch sensing phase of the touch screen, and can serve as display circuitry during a display phase of the touch screen. During the display phase, the common electrodes may be driven to a reference voltage while display pixels are updated or scanned. In some examples, one driving circuit can drive multiple common electrodes. In some examples, the driving circuit can be selectively coupled to one or more of the multiple common electrodes to be driven. In certain circumstances, the voltage(s) on the common electrodes can be disturbed from the reference voltage (e.g., as a result of voltage changes on other touch screen components that may be in proximity to, or otherwise capacitively coupled to, the common electrodes). The time that it can take for the driving circuit to reestablish the voltage on the common electrodes to the reference voltage, which can be referred to as the settling time of the driving circuit, can be affected by how well the output of the driving circuit is optimized for the resistance and the capacitance presented at the output of the driving circuit—for example, the resistance and capacitance presented to the driving circuit by the common electrodes. Because the driving circuit can be selectively coupled to different common electrodes during different periods of touch screen operation, and because different display pixels can be updated or scanned during those periods, the resistance and capacitance presented at the output of the driving circuit can vary. Therefore, it can be beneficial to dynamically adjust the output of the driving circuit (i.e., utilize "dynamic driving circuits") such that it is optimized for the resistance and capacitance presented at the output of the driving circuit.

Figure 1C:
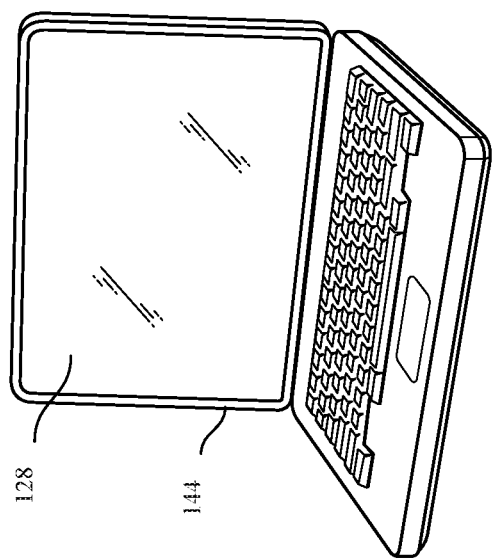
FIGS. 1A-1C illustrate an example mobile telephone, an example media player, and an example portable computing device that each include an exemplary touch screen according to examples of the disclosure.
Figure 1B:
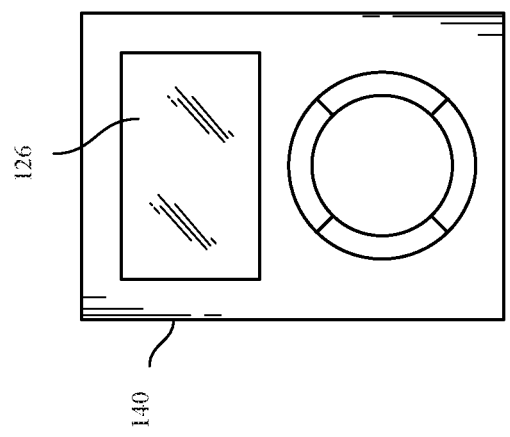
Figure 1A:
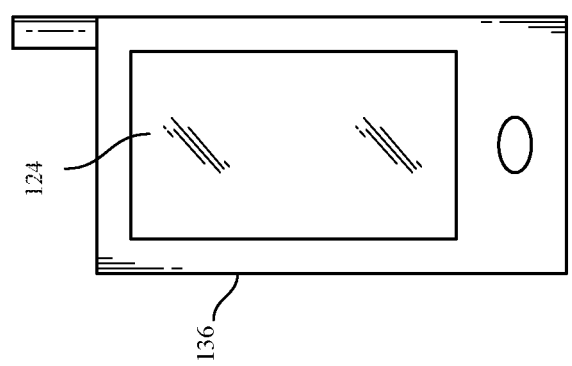

FIGS. 1A-1C show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example portable computing device 144 that includes a touch screen 128. Touch screens 124, 126, and 128 can be based on self-capacitance. A self-capacitance based touch system can include a matrix of small, individual plates of conductive material that can be referred to as common electrodes. For example, a touch screen can include a plurality of individual common electrodes, each common electrode identifying or representing a unique location on the touch screen at which touch or proximity (i.e., a touch or proximity event) is to be sensed, and each common electrode being electrically isolated from the other common electrodes in the touch screen/panel. Such a touch screen can be referred to as a pixelated self-capacitance touch screen. During operation, a common electrode can be stimulated with an AC waveform, and the self-capacitance to ground of the common electrode can be measured. As an object approaches the common electrode, the self-capacitance to ground of the common electrode can change. This change in the self-capacitance of the common electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126 and 128 can be based on mutual capacitance. A mutual capacitance based touch system can include drive and sense lines that may cross over each other on different layers, or may be adjacent to each other on the same layer. The crossings or adjacent locations can be referred to as touch nodes. During operation, a drive line can be stimulated with an AC waveform and the mutual capacitance of the touch node can be measured. As an object approaches the touch node, the mutual capacitance of the touch node can change. This change in the mutual capacitance of the touch node can be detected and measured by the touch sensing system to determine the positions of multiple objects when they touch, or come in proximity to, the touch screen.

Figure 2:
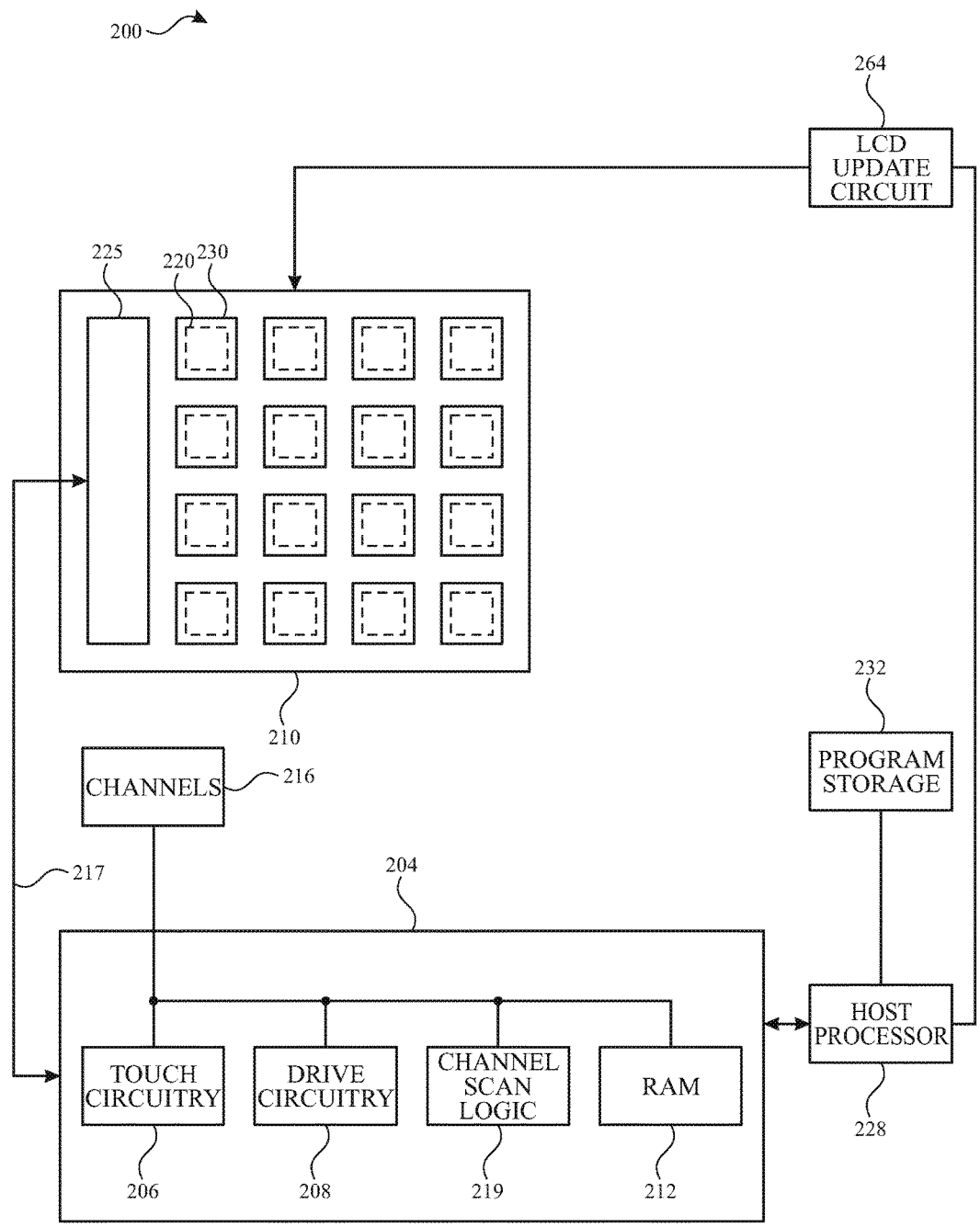
FIG. 2 is a block diagram of an example computing system that illustrates one implementation of an example self-capacitance touch screen according to examples of the disclosure.

FIG. 2 is a block diagram of an example computing system 200 that illustrates one implementation of an example self-capacitance touch screen 210 according to examples of the disclosure. Computing system 200 can be included in, for example, mobile telephone 136, digital media player 140, portable computing device 144, or any mobile or non-mobile computing device that includes a touch screen, including a wearable device. Computing system 200 can include a controller 204 which can include touch circuitry 206, drive circuitry 208, channel scan logic 214, and random access memory (RAM) 212. Touch circuitry 206 can include, but is not limited to, one or more channels 216 (e.g., drive/sense channels), and circuitry configured to detect capacitance sensed on the channels 216. Drive circuitry 208 can include, but is not limited to, one or more drivers configured to drive common electrodes 230. Channel scan logic 214 can provide control for the touch circuitry 206 and drive circuitry 208. Channel scan logic 214 can also control channels 216 to generate stimulation signals at various frequencies and phases. In some examples, channel scan logic 214 can send control signals to drive/sense interface 225 so as to selectively couple one or more channels 216 to one or more common electrodes 230. In some examples, controller 204 and drive/sense interface 225 can be integrated into a single application specific integrated circuit (ASIC), and in some examples can be integrated with touch screen 210 itself. Exemplary structure and operation of drive/sense interface 225 will be described later. Additionally, while touch circuitry 206, drive circuitry 208, channel scan logic 214 and RAM 212 are illustrated as being coupled together, they need not be. For example, RAM 212 may only be coupled directly to channel scan logic 214.

Touch screen 210 can include touch sensing circuitry that can include a capacitive sensing medium having a plurality of electrically isolated common electrodes 230 (e.g., a pixelated self-capacitance touch screen). Common electrodes 230 can be either coupled to channels 216 in controller 204, can be driven by stimulation signals from the channels 216 through drive/sense interface 225, and/or can be sensed by the channels through the drive/sense interface as well, as described above.

In other examples, touch screen 210 can include touch sensing circuitry that can include a capacitive sensing medium having a plurality of drive lines and a plurality of sense lines (e.g., a mutual capacitance touch screen). It should be noted that the term "lines" (e.g., drive lines and/or sense lines) is sometimes used herein to mean simply conductive pathways, as one skilled in the art will readily understand, and is not limited to elements that are strictly linear, but includes pathways that change direction, and includes pathways of different size, shape, materials, etc., and multiple electrically conductive circuit elements that can be electrically connected to form a single electrically conductive pathway. Drive lines can be selectively driven by stimulation signals from channels 216 and drive/sense interface 225, and resulting sense signals can be transmitted through the drive/sense interface to channels 216. In this way, drive lines and sense lines can be part of the touch sensing circuitry that can interact to form capacitive sensing nodes.

Touch screen 210 can also include display circuitry including a plurality of display pixels 220 for displaying images on the touch screen (shown in dashed lines in FIG. 2). Each display pixel 220 can include a thin film transistor (TFT) having a gate line and data line coupled to a display pixel electrode. Each display pixel 220 can also include a pixel common electrode. Computing system 200 can also include display circuitry for displaying a pixel image on each display pixel 220. A display controller, such as LCD Update Circuit 264, can be configured to provide voltages on select lines (e.g., gate lines) to each pixel transistor associated with a display pixel 220. The LCD Update Circuit 264 can further be configured to provide data signals along data lines to these same transistors to control the display pixel image (i.e., to update the display pixel) as described in more detail with reference to FIG. 4B below. During the period that one or more display pixels 220 are being updated, channels 216, which can operate as drive/sense channels in the touch circuitry, can operate as common voltage lines in the display circuitry. In some examples, channel scan logic 214 can send control signals to drive/sense interface 225 so as to selectively couple one or more pixel common electrodes to channels 216, and channels 216 can supply a common voltage from drive circuitry 208. In some configurations, the pixel common electrode of a display pixel can also function as a common electrode 230 as discussed above. In some examples, multiple display pixels can share one common electrode as a pixel common electrode, as shown in more detail with reference to FIGS. 3A-3C. "Common electrodes" as used throughout this disclosure can refer to common electrodes in both the context of display circuitry and touch circuitry.

Computing system 200 can also include a host processor 228 for receiving outputs from controller 204 and performing actions based on the outputs. For example, host processor 228 can be connected to program storage 232 and a display controller, such as an LCD Update Circuit 264. As explained, LCD Update Circuit 264 can update the pixel image of display pixels 220. Host processor 228 can use LCD Update Circuit 264 to generate an image on touch screen 210, such as an image of a user interface (UI), and can use controller 204 to detect a touch on or near touch screen 210. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory and executed by controller 204, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Referring back to FIG. 2, in some examples, touch screen 210 can be an integrated touch screen in which touch sensing circuit elements of the touch sensing system can be integrated into the display pixel stackups of a display. The circuit elements in touch screen 210 can include, for example, elements that can exist in LCD or other displays, such as one or more pixel transistors (e.g., thin film transistors (TFTs)), gate lines, data lines, pixel electrodes and common electrodes. In any given display pixel, a voltage between a pixel electrode and a common electrode can control a luminance of the display pixel. The voltage on the common electrode can be supplied by a drive circuitry 208 on a controller 204. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 3A:
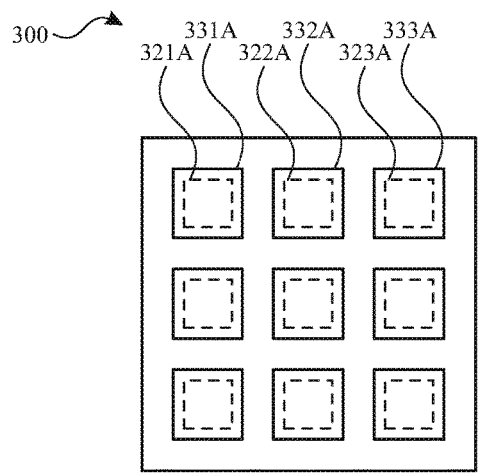
FIGS. 3A-3C illustrate example configurations in which common electrodes can form portions of the touch sensing circuitry of a touch sensing system according to examples of the disclosure.
Figure 3B:
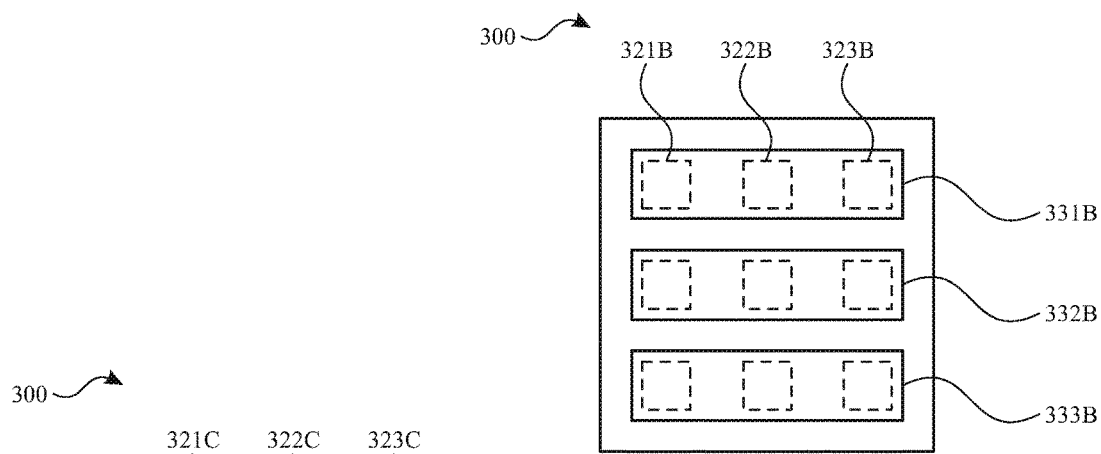
Figure 3C:
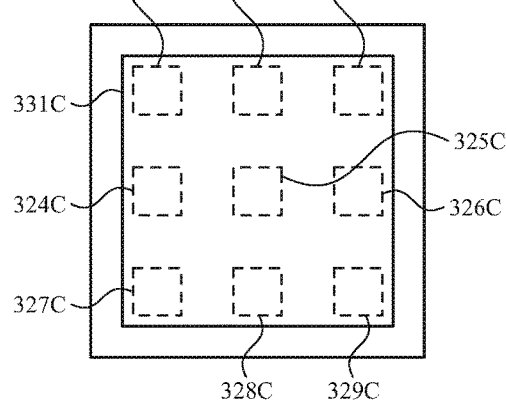

FIGS. 3A-3C illustrate example configurations in which common electrodes can form portions of the touch sensing circuitry of a touch sensing system, as described above. In some examples, each common electrode can include one or more display pixels, and each display pixel can include a portion of a common electrode, which can be a circuit element of the display system circuitry in the display pixel stackup (i.e., the stacked material layers forming the display pixels) of the display pixels of some types of LCDs or other displays—in other words, the common electrodes can operate as part of the display system to display an image on touch screen 300. Specifically, in the example shown in FIG. 3A, common electrodes 331*a*-333*a* can operate as common electrodes for display pixels 321*a*-323*a*, respectively. In the example shown in FIG. 3B, common electrode 331*b* can operate as a shared common electrode for display pixels 321*b*-323*b*. In the example shown in FIG. 3C, common electrode 331*c* can operate as a shared common electrode for all of display pixels 321*c*-329*c*.

In the examples shown in FIGS. 3A-3C, each common electrode can serve as a multi-function circuit element that can operate as display circuitry of the display system of touch screen 300 and can also operate as touch sensing circuitry of the touch sensing system. Specifically, each common electrode can operate as a common electrode of the display circuitry of the touch screen 300 (e.g., during a display phase) as described above, and can also operate as a common electrode (i.e., "touch pixel electrode") of the touch sensing circuitry of the touch screen (e.g., during a touch sensing phase). In the example illustrated in FIG. 3A, changes in the total self-capacitance of the common electrodes 331*a*-333*a* can be sensed using one or more touch circuits, as previously discussed with reference to FIG. 2. In the example illustrated in FIG. 3B, common electrodes 331*b*-333*b* can operate as drive lines or sense lines in a mutual capacitance touch screen, and changes in mutual capacitance on electrodes 331*b*-333*b* can be similarly sensed using touch circuitry, as discussed with reference to FIG. 2. In the example illustrated in FIG. 3B, common electrodes 331*b*-333*b* can operate as drive lines or sense lines in a mutual capacitance touch screen, and changes in mutual capacitance on electrodes 331*b*-333*b* can be similarly sensed using touch circuitry, as discussed with reference to FIG. 2. In the example illustrated in FIG. 3C, common electrode 331 can similarly operate as a drive line or sense line in a mutual capacitance touch screen, and changes in mutual capacitance on electrode 331*c* can be similarly sensed using touch circuitry, as discussed with reference to FIG. 2.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlapping, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes and display pixels of FIGS. 3A-3C are shown as rectangular or square regions on touch screen 300. However, it is understood that the common electrodes and display pixels are not limited to the shapes, orientations, and positions shown, but can include any suitable configurations according to examples of the disclosure. Therefore, in accordance with examples of the disclosure, touch sensing circuitry can be integrated with a display in such a way that the structure and operation of the touch sensing circuitry can be independent from the structure and operation of the display. In other words, while display elements and touch elements can be integrated in a single stackup, in some examples, the two portions can be completely separate within the stackup. As such, the display circuitry can be designed substantially based on desired display operation with substantially no regard for touch operation. Further, the examples of the disclosure will be provided in the context of a touch screen, but it is understood that the examples of the disclosure can similarly be applied to any device which has a display, as will be described in further detail below.

Figure 4A:
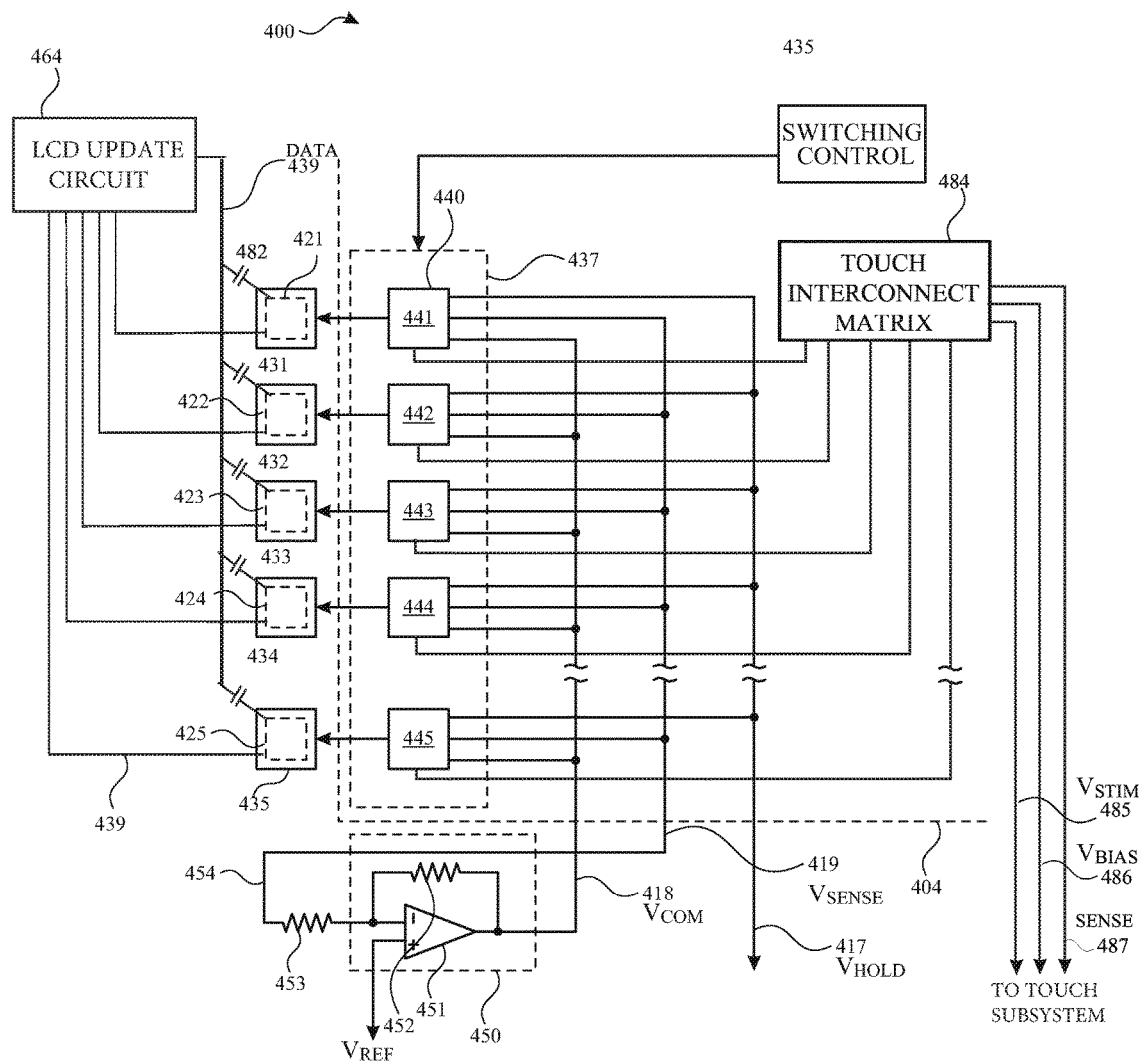
FIGS. 4A-4B illustrate simplified circuit diagrams of a touch screen system having a driving circuit with a fixed output according to examples of the disclosure.

FIG. 4A symbolically illustrates a circuit diagram of an exemplary touch screen 400, in which a driving circuit 450 has a fixed output configuration according to examples of this disclosure. It should be understood that these components are provided by way of example only, and in some examples, touch screen system 400 can have components that differ from those illustrated in FIG. 4A. For simplicity of illustration, only five common electrodes 431-435 are shown, along with one driving circuit 450 and one controller 404. Some touch screen examples can have multiple controllers 404 and/or multiple driving circuits 450, each being associated with one or more common electrodes and/or display pixels.

Figure 4B:
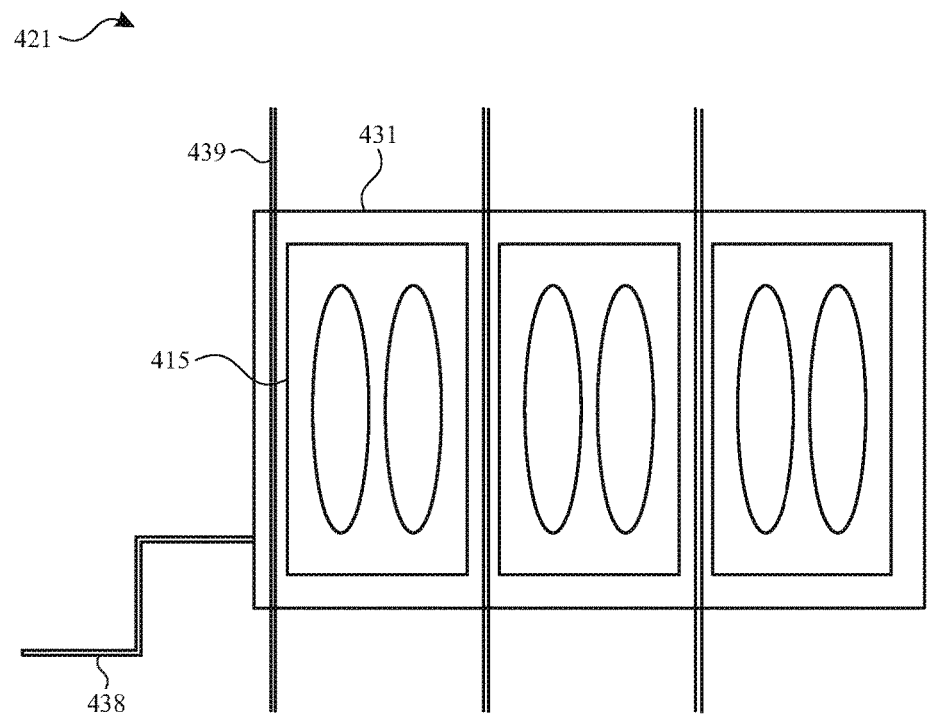

In some configurations, during a display phase of touch screen 400, LCD Update Circuit 464 can be configured to "update" display pixels 421-425 to control the display pixel image. In this way, the host processor can utilize LCD Update Circuit 464 to generate an image on touch screen 400. FIG. 4B illustrates a symbolic diagram of display pixel 421 (including subpixels) with a TFT (not shown) having a gate line 438 and a data line 439 coupled to a display pixel electrode 415. The display pixel can have a common electrode 431. During a display update of display pixel 421, the LCD Update Circuit 464 can selectively apply a gate voltage to gate line 438, switching the TFT of the display pixel on. While the TFT is switched on, LCD Update Circuit 464 can update display pixel 421 by applying a data voltage to the pixel electrode 415 via data line 439. At the same time, common electrode 431 can be driven to a specified display voltage (e.g., a reference voltage Vref). The difference in potential between the pixel electrode 415 and common electrode 431 can determine the luminance of display pixel 421. The LCD Update Circuit 464 can switch off the TFT when the luminance has been set (e.g., at a "set" time). If the voltage supplied to a common electrode associated with a display pixel that is being updated is not accurate (e.g., the output from driving circuit 450 to common electrode 431 varies from voltage Vref), then the luminance of the display pixel (e.g., display pixels 421-425) may be set incorrectly, resulting in visual errors in the display, as will be discussed in more detail with reference to FIG. 5 below.

For example, display pixels 421-425 can be arranged in a column configuration and may share a plurality of data lines 481 from LCD Update Circuit 464. Each display pixel can be assigned a dedicated gate line (e.g., gate line 438) from LCD Update Circuit 464. As discussed, one or more activated gate lines will cause the display pixels to be updated according to the voltage level on data line intersecting those display pixels. Typically, the voltage change of the data line in preparation of a display update will cause a perturbation on the common electrodes 431-435 via the parasitic capacitance (e.g., parasitic capacitance 482) of the data line to the common electrodes. In some examples, touch screen 400 can takes advantage of the fact that common electrodes 431-435 experience similar levels of perturbation due to the shared data line connection 439. In some configurations discussed herein, the settling time of common electrodes 431-435 can be improved by sensing the perturbation on one common electrode, then creating an inverted and gained version of the signal and applying it to a driven touch pixel to effectively cancel the perturbation at the driven common electrode where the display update occurs. Thus, because the amount of perturbation and the phase of the perturbation on a common electrode can vary as a function of location, it can be beneficial to vary the gain applied to the common electrode to account for the difference in perturbation according to examples of this disclosure.

Touch screen system 400 can further include a switching circuit 437 comprising a plurality of routing units 441-445. Each routing unit 441-445 can be configured to selectively couple a corresponding common electrode 431-435 to one or more lines, for example, Vcom 418, Vsense 419, or Vhold 417. Vcom 418 can represent the output line from the driving circuit 450. As will be explained in more detail below, driving circuit 450 can be configured to drive one or more common electrodes with a display voltage (e.g., reference voltage Vref), including common electrodes associated with updating display pixels. For example, if display pixel 421 is updating, routing unit 441 can couple common electrode 431 to the driving circuit 450 output, Vcom 418. Vhold 417 can represent an output line from a hold circuitry (not shown) providing a hold voltage. In some examples, if a display pixel is not being updated, Vhold 417 can be applied to the corresponding common electrode to maintain the luminance of the display pixel. In some examples, the hold circuitry (not shown) can comprise a capacitor. Vsense 419 can represent, in some configurations, an inverting input to the driving circuitry 450. For example, during a display phase of the touch screen, routing units 441-445 can be configured to respectively couple one or more common electrodes to Vsense 419 in order to provide feedback to the driving circuit 450. In some examples, the inverting input of the operational amplifier 451 can be coupled to a common electrode that neighbors or is otherwise near the common electrode being driven by the operational amplifier. In some examples, the inverting input of operational amplifier 451 can be coupled to a common electrode that the operational amplifier is driving.

As shown, routing units 441-445 can each have a plurality of connections to the touch subsystem. Each routing unit can have a plurality of switches each connecting to a Touch Interconnect Matrix 484. Signals with same index from a given switching circuit are shorted in the Touch Interconnect Matrix 484, and each of those shorted connections can represent one or more drive signals Vstim 485, a bias signal Vbias 486 or one or more sense signals 487 during a touch sensing phase.

Moreover, though not shown here, during a touch sensing phase, routing units 441-445 of switching circuit 437 can be configured to couple common electrodes 431-435 to one or more touch sensing circuits (not shown), such that common electrodes 431-435 act as touch electrodes in either a self-capacitance configuration or mutual-capacitance configuration. In some examples, switching circuit 437 can operate in accordance with signals received from a switching control circuit 437. It should be understood that inputs Vcom, Vsense, and Vhold are exemplary only; in other examples, switching circuit 437 can be configured to couple a respective common electrode 431-435 to any other circuitry or voltage which is appropriate for operating the touch screen system 400 during a display phase and/or touch sensing phase. Moreover, in some examples, common electrodes may be electrically disconnected (e.g., floating) from any lines.

Driving circuit 450 will now be described in more detail with reference to FIG. 4A above, and the description of driving circuit 450 can apply equally to any additional driving circuits that may be driving common electrodes. Driving circuit 450 can include operational amplifier 451. A reference voltage (Vref) can be coupled to the non-inverting input of operational amplifier 451. Vref can be the voltage to which the common electrode of interest is to be driven (e.g., the common electrode to which driving circuit 450 is or will be coupled). Feedback resistor 452 can be coupled between the output of operational amplifier 451 and the inverting input of the operational amplifier. Feedback can be provided to operational amplifier 451 by coupling, via input resistor 453, the inverting input of the operational amplifier to one or more common electrodes 431-435 in touch screen 400 (e.g., switching circuit 437 can selectively couple the feedback line 454 of operational amplifier 451 to one or more common electrodes 431-435). As discussed, the inverting input of the operational amplifier 451 can be coupled to a common electrode that is being driven, or couple to a common electrode that neighbors or is otherwise near the common electrode being driven. In some examples, as in the configuration of FIG. 4A, driving circuit 450 can be external to the controller 404. It should be understood that the provided configuration of driving circuit 450 is exemplary only, and that other circuit configurations may be employed; for example, additional components such as resistors and capacitors can be utilized in the driving circuit configuration, as appropriate.

The ratio between the feedback resistor 452 and the input resistor 453 can control the gain of operational amplifier 451. Generally, the gain of an amplifier can be selected based on input and loading conditions of the amplifier. It can be useful to define these load conditions in terms of "RC time constants" equal to the product of the circuit resistance and the circuit capacitance seen at a common electrode driven by the amplifier. As will be discussed, it can be particularly useful to consider the RC time constants associated with common electrodes having an updating display pixel. Each common electrode can be associated with a separate RC time constant. For example, the RC time constant associated with common electrode 431 can be different than the RC time constant associated with common electrode 435 at least partly due to the difference in trace resistance (e.g., the resistance of the conductive path from a common electrode to the drive circuitry). In addition, as will be discussed with reference to FIGS. 7A-7D below, a single common electrode can be associated with multiple RC time constants. Generally, when the output of an amplifier is not optimized for a specific RC time constant, the performance of the amplifier can be hindered, as will be explained in more detail below.

In the example configuration shown in FIG. 4A, switching circuit 437 can selectively couple one or more common electrodes 431-435 to a variety of lines (e.g., Vcom 418, Vsense 419, or Vhold 417) in a variety of electrode coupling configurations. Additionally, LCD Update Circuit 464 can update one or more display pixels according to one or more LCD updating configurations. Because these configurations can vary, the RC time constant of the elements being driven by driving circuit 450 can also vary. As will become apparent, it can be difficult to select an optimal fixed gain for driving circuit 450 (e.g., fixed values for input resistor 453 and feedback resistor 452) based on the range of possible RC time constants. As a result, the settling time of the driving circuit 450 can be undesirably long, leading to visual errors in display pixels, as will be discussed in more detail below.

In some examples, the voltages on common electrodes 431-435 (in some examples, Vref) can be disturbed—that is to say that the voltages can deviate from Vref. These deviations can be caused for any number of reasons, including capacitive coupling that can exist between the common electrodes and other components of touch screen 400. For example, if LCD Update Circuit 464 changes a voltage on a display pixel data line, and if that data line is positioned so as to be capacitively coupled to a common electrode, the voltage on the common electrode can, via the capacitive coupling, be disturbed from its initial value (e.g., Vref). In order to reestablish the voltage on the disturbed common electrode to the target voltage (e.g., Vref), driving circuit 450 may need to charge or discharge the common electrode through the circuit elements connected to the output of the driving circuit 450 (e.g., the elements contributing to the RC time constant of the common electrode). In examples where driving circuit 450 is driving multiple common electrodes with a fixed output, it can take a relatively long time (i.e., a slow settling time) to return certain disturbed common electrodes to the target voltage.

Figure 5:
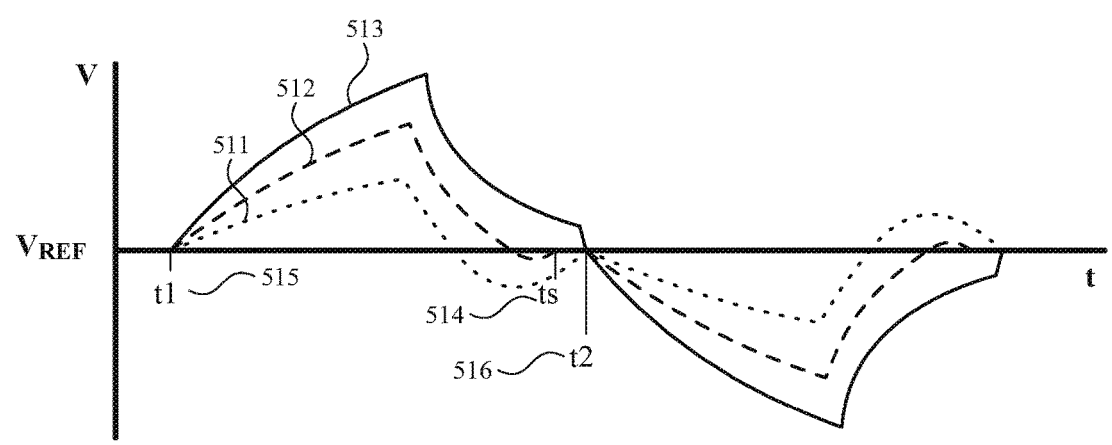
FIG. 5 illustrates an exemplary common electrode voltage plot comparing common electrode voltage settling behavior in a touch screen system having a driving circuit with a fixed output according to examples of the disclosure.

In some examples, the relatively slow settling time of driving circuitry with a fixed output (e.g., a fixed gain) can cause display errors when display pixels are updated by an LCD Update Circuit. FIG. 5 illustrates three exemplary voltage plots 511, 512, and 513 of three example common electrodes at three different physical positions in a touch screen. The horizontal axis can represent time, the vertical axis can represent the voltage on a common electrode, and Vref can represent a target voltage for each of the common electrodes. Plots 511, 512, and 513 can represent three cases where the voltage on a respective common electrode is driven by a driving circuit with a fixed output (e.g., the driving circuit 450 of FIG. 4A) and the electrode's associated display pixel is updated by an LCD Update Circuit, as will be described in detail below. For example, voltage plot 511 can correspond to voltage on a first common electrode near to the driving circuit (e.g., common electrode 435) when a first display pixel associated with the first common electrode is being updated. Voltage plot 512 can correspond to a second common electrode further from the driving circuit than the common electrode of plot 511 (e.g., common electrode 434) when an associated second display pixel is being updated. Voltage plot 513 can correspond to a third common electrode even further from the driving circuit than the common electrode of plot 512 (e.g., common electrode 431) when an associated third display pixel is being updated. For the purposes of this example, the fixed output of the driving circuit can be assumed in each case to be optimized for a single RC time constant which results in the smallest voltage settling error possible for all common electrodes. Although voltage plots 511, 512, and 513 have been superimposed onto one another for convenience of comparison, it should be noted that each voltage plot can, in some examples, represent a separate moment in time (e.g., if the respective display pixels associated with each common electrode are updated separately). Likewise, each of t1, t2 and ts can represent a separate instance in time, though, in every case, each instance of t1 shares the same relationship to t2 and ts, t2 to ts, and so on.

In each case, a time t1 515 can represent a point at which the voltage on each respective common electrode is disturbed (e.g., due to capacitive coupling), as illustrated. In cases where a disturbed common electrode is near to the driving circuit, the voltage on the common electrode can recover towards Vref at a relatively fast rate, as illustrated by 511. However, in some cases, the voltage on the common electrode can overshoot Vref (shown in FIG. 5 as 511 dipping below Vref), resulting in slower settling times. In cases where the disturbed common electrode is far from the driving circuit, the voltage on the common electrode can recover towards Vref at a relatively slow rate, as illustrated by 513, also resulting in slower settling times. In cases where the disturbed common electrode is associated with an RC time constant close to the RC time constant to which the driving circuit is optimized, the voltage on the common electrode can recover to Vref relatively quickly, as illustrated by 512, without significantly overshooting Vref.

In each case at time t2 516, the voltage on each common electrode can be disturbed for a second time, as illustrated. In some examples, the second disturbance can occur before the common electrode recovers to Vref. Similar to the voltage response after the first disturbance, after the second disturbance, when the disturbed common electrode is near to the driving circuit, the voltage on the common electrode can have relatively slow settling times as shown in 511. When the disturbed common electrode is far from the driving circuit, the voltage on the common electrode can also have a relatively slow settling time as shown in 513. When the common electrode is associated with an RC time constant close to the RC time constant to which the driving circuit is optimized, settling times can be relatively fast, as shown in 512.

In some cases, a disturbance of the voltage on a common electrode (e.g., those shown at t1 515 and t2 516) can occur while a display pixel corresponding to the common electrode is being updated. As discussed above with reference to FIG. 4B, an LCD Update Circuit can apply a gate voltage to a gate line of a display pixel and a data voltage to the pixel electrode of the display pixel. The difference in potential between the pixel electrode and common electrode of a display pixel can determine the luminance of display pixel. In each case, time ts 514 in FIG. 5 can represent a "set" time, wherein the LCD Update Circuitry sets a voltage on the data line of a display pixel. As indicated above, in some cases, ts as shown can represent three instances of set times, one for each common electrode (and corresponding updating display pixel) associated with plots 511, 512, and 513. However, for convenience of comparison, each set time is superimposed onto one another and represented as ts. In some cases, the data value, and thus luminance, of a display pixel can be set while voltage on a common electrode is recovering from a disturbance. For example, if a voltage has a relatively slow settling time, the voltage on the electrode can either be higher or lower than the target voltage, Vref, at the set time is 514, as shown in 511 and 513. As a result, inaccurate luminances can be set, leading to display errors. Thus, it can generally be desirable for the voltage on the common electrode of interest (e.g., a common electrode corresponding to an updating display pixel) to quickly return to its target voltage (e.g., Vref) for the reasons above.

Figure 6A:
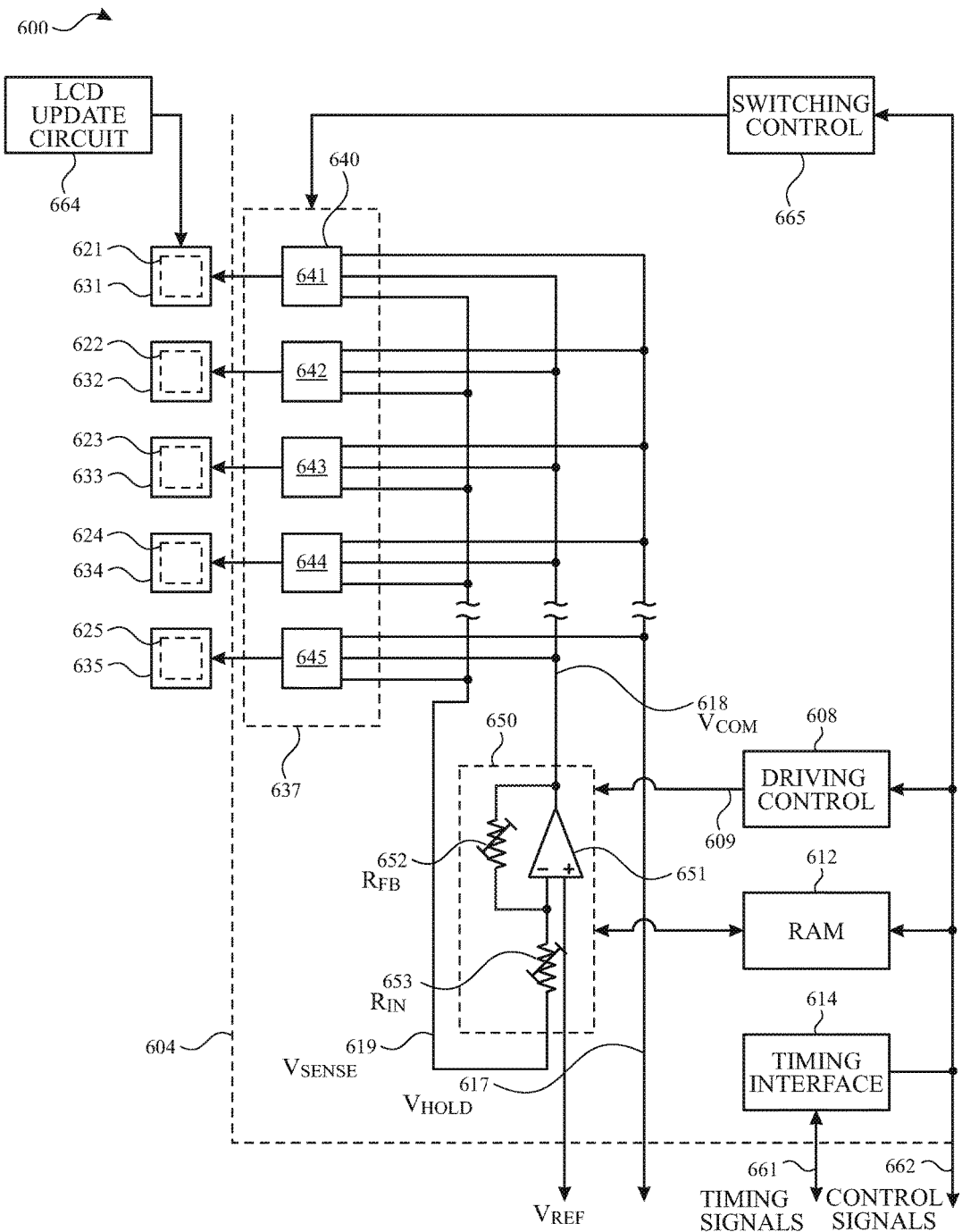
FIG. 6A-6B illustrates a simplified circuit diagram of an exemplary touch screen system having a dynamic driving circuit with a dynamic output according to examples of the disclosure.

Because it can generally be desirable for the voltage on a common electrode to quickly settle to a target voltage after a disturbance, it can be beneficial to configure the touch screen to include a dynamic driving circuit, which can adjust its output with each change to the LCD update configuration or electrode coupling configuration. In some examples, the output of the dynamic driving circuit can be adjusted according to one or more dynamic values associated with the dynamic driving circuit, for example, resistor values in the dynamic driving circuit. In some examples, each dynamic value can be predetermined to provide an acceptable output for the RC time constant associated with the electrode or electrodes of interest (e.g., electrodes associated with updating display pixels) in a certain configuration. An exemplary circuit diagram of a touch screen 600 having a driving circuit 650 with a dynamic output is illustrated in FIG. 6A. As in the touch screen configuration shown in FIG. 4A, touch screen 600 can have a plurality of display pixels 621-625, each associated with a common electrode 631-635, whose function is analogous to the display pixels 421-425 and common electrodes 431-435 described with reference to FIG. 4A. Moreover, as in the configuration shown in FIG. 4A, a switching circuit 637 and switching control circuit 665 (analogous, e.g., to switching circuit 437 and switching control 465) can selectively couple a variety of lines (e.g., Vcom 618, Vsense 619, and Vhold 617) to one or more common electrodes 631-635 using routing units 641-645. However, unlike in the configuration of FIG. 4A, touch screen 600 shown in FIG. 6A can include a dynamic driving circuit 650 having a dynamic output. Further unlike the configuration shown in FIG. 4A, the dynamic driving circuit 650 can, in some examples, be formed on the same integrated circuit as the switching circuit 637, switching control circuit 665, driving control circuit 608, RAM 612, and timing interface 614.

Dynamic driving circuit 650 can include an operational amplifier 651, a feedback resistance Rfb, and an input resistance Rin, represented respectively in FIG. 6A as boxes 652 and 653. In some examples, feedback resistance Rfb and/or Rin can be dynamic values configured to provide a dynamic output. For example, the gain of the dynamic driving circuit can be based, at least in part, on the values of resistances Rfb 652 and Rin 653. Therefore, if the resistance of these resistors are dynamic values, Rfb 652 and/or Rin 653 can be adjusted dynamically such that the output (e.g., gain) of the dynamic driving circuit 650 is likewise adjusted dynamically. In some examples, the resistance values Rfb 652 and/or Rin 653 can be adjusted using a plurality of resistors and a switching network configured to selectively couple one or more of the resistors to the feedback line and/or input line. In some examples, the resistance values Rfb 652 and/or Rin 653 can be adjusted using one or more variable resistors. Additionally or alternatively, in other configurations, the dynamic output of the dynamic driving circuit can include an adjustable slew rate, as will be discussed in more detail with reference to FIG. 6C below. It should be understood that the provided configuration of driving circuit 650 is exemplary only, and that other circuit configurations may be employed; for example, additional components such as resistors and capacitors can be utilized in the driving circuit configuration, as appropriate.

Figure 6B:
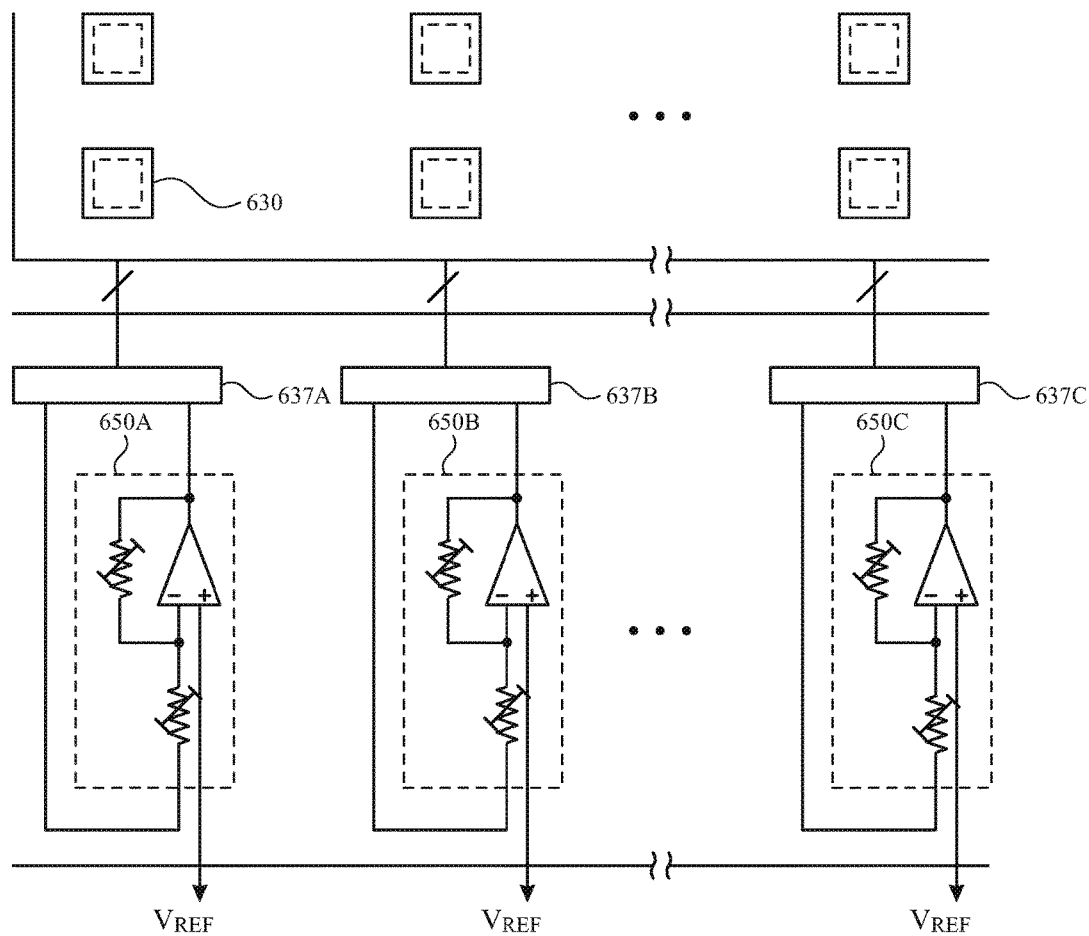

FIG. 6B shows an example configuration in which multiple dynamic driving circuits 650 can be configured to drive multiple common electrodes. For clarity, some elements have been omitted. As shown in FIG. 6B, each dynamic driving circuit 650 can be associated with a switching circuit 637 and a plurality of common electrodes 620 with corresponding display pixels (i.e., pixel columns). In some cases, a pixel column can correspond to every pixel in a given column of a touch screen. In some examples, each dynamic driving circuit 650 can have a unique dynamic output at any given time (e.g., if the LCD update configuration and/or electrode coupling configurations are different between pixel columns). In other examples, each dynamic driving circuit can have a matching dynamic output (e.g., if the LCD update configuration and electrode coupling configurations are identical between columns). One skilled in the art would appreciate that matching dynamic outputs can include outputs that are within a 10% tolerance of one another.

Figure 6C:
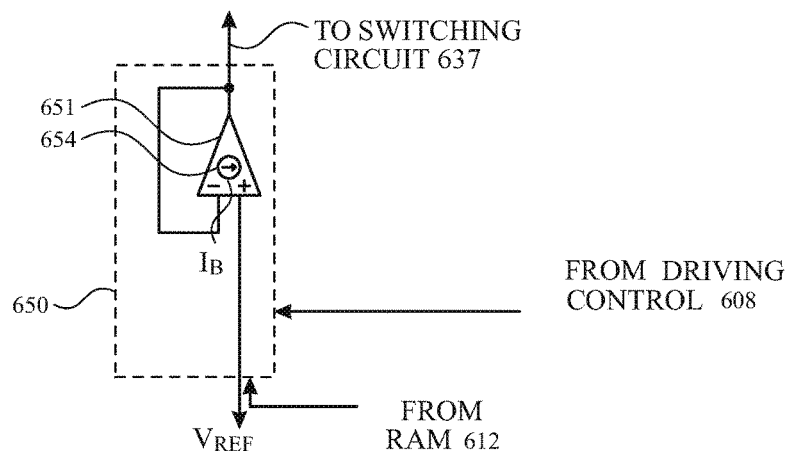
FIG. 6C illustrates an exemplary dynamic driving circuit with an adjustable slew rate according to examples of this disclosure.

The examples above are focused on using a dynamic driving circuit wherein the adjustable output is gain. However, other adjustable outputs are within the scope of this disclosure, which can be used in place of, or in addition to, an adjustable gain. FIG. 6C illustrates an example configuration, in which a dynamic driving circuit 650 can include an adjustable slew rate. In some examples, a bias current Ib 654 inside an amplifier 651 of the dynamic driving circuit 650 can be designed such that the slew rate of the amplifier 651 is adjustable to achieve reduced voltage settling times, as will be discussed with reference to FIG. 9. As in the configuration shown in FIG. 6A, the dynamic driving circuit 650 can be coupled to a switching circuit 637, driving control 608 and memory, such as RAM 612. In some examples, the amplifier 651 can be in a unity gain configuration. Similar to the examples described above, each of a plurality of slew rates can correspond to a different electrode coupling configuration and/or LCD update configuration. In such a configuration, an improved slew rate can improve settling time of the voltage on a common electrode, and thus, reduce display errors.

In some examples, the dynamic value (e.g., resistive values Rfb 652 and/or Rin 653) can be adjusted according to the physical location of whichever common electrode is of interest. For example, if display pixel 621 is being updated, the common electrode of interest can be common electrode 632. Rfb 652 and/or Rin 653 can be selected to be resistive values predetermined to provide an acceptable output for the RC time constant associated with electrode 632. In some examples, driving control circuit 608 can be logic configured to adjust the dynamic output by adjusting resistive values Rfb 652 and/or Rin 653. In some configurations, driving control signals 609 can be sent to the dynamic driving circuit 650, which can include timing signals, or instructions to adjust the dynamic output. In some configurations, driving control circuit 608, switching control circuit 665, and/or dynamic driving circuit 650 can be configured to retrieve dynamic driving circuit output information from memory. Memory is shown in FIG. 6A as RAM 612, though it should be noted that in other examples, driving control circuit 608, switching control circuit 665 can retrieve and write data to multiple memories. In some examples, a timing interface can send and receive timing signals 661 from outside of the controller 604, and various voltages and control signals 662 can also be received from outside of the controller 604. The operation of these components will be explained in more detail below. Many other components, both outside of controller 604 and within, are contemplated within the scope of this disclosure, including, for example, additional logic, circuit elements, and memory.

As discussed, in some examples, a single driving circuit (e.g., dynamic driving circuit 650) can be configured to be selectively coupled to one or more common electrodes in a plurality of electrode coupling configurations (e.g., the configuration of switching circuit 637), and a plurality of LCD updating configurations (e.g., the configuration of LCD Update Circuit 664). Each configuration can potentially present a different RC time constant at the output of dynamic driving circuit 650. In order to reduce display errors, dynamic driving circuit 650 can adjust its output with each configuration change. Examples of these configurations are discussed below with reference to FIGS. 7A-7D.

FIGS. 7A-7D illustrate four simplified circuit diagrams of a touch screen in various LCD updating configurations and electrode coupling configurations according to examples of the disclosure. A dynamic driving circuit 750 is shown in each of FIGS. 7A-7D. Like driving circuit 650 shown in FIG. 6, dynamic driving circuit 750 can have different outputs for different electrode coupling configurations and different LCD updating configurations. In the examples shown here, the output of the dynamic driving circuit 750 can be controlled by varying the feedback resistance Rfb of the dynamic driving circuit 750. In FIGS. 7A-7D, each common electrode 731-739 can be selectively coupled to one or more lines, for example, using switching circuit 637 shown in FIG. 6A (though it is understood that in some examples, one or more of common electrodes 731-739 can remain floating). Each common electrode 731-739 can be associated with one or more display pixels 721-729, shown in FIGS. 7A-7D with dashed lines. For clarity of illustration, elements such as routing units have been omitted. As shown in FIGS. 7A-7D, multiple common electrodes can be coupled to a Vcom line 718, which can correspond to the dynamic driving circuit 750 output. Other common electrodes can be coupled to a Vsense line 719, which can correspond to an input of the dynamic driving circuit 750. Other common electrodes can be connected to a Vhold line 717, which can correspond to an output of a holding circuit. In each configuration shown, one or more display pixels can be updated, for example, by LCD Update Circuit 664 shown in FIG. 7. Display pixels being updated are represented in FIGS. 7A-7D with cross hatching. Though not shown here, in other configurations, multiple display pixels may correspond to (or share) a single common electrode as in the configuration shown in FIGS. 3B-3C. In such a configuration, one or more display pixels can be concurrently updated by LCD Update Circuit 664 while corresponding common electrodes are coupled to the dynamic driving circuit 750.

FIG. 7A shows a first block diagram representing a first example configuration 701 in which each common electrode 731-739 is selectively coupled to one or more lines. Four common electrodes 731-734 can be coupled to Vcom line 718. Two common electrodes 735-736 can be coupled to Vsense line 719. Three common electrodes 737-739 can be connected to Vhold line 717. Common electrode 732, which is coupled to Vcom line 718, can have a corresponding display pixel 722, which is being updated, for example, by LCD Update Circuit 664 in FIG. 7. The feedback resistance $Rfb_1$ can be updated to a value which has been predetermined to provide an acceptable output for the RC time constant of the common electrode of interest. The common electrode of interest can be a common electrode corresponding to an updating display pixel, as these electrodes have the highest chance of causing error, as discussed with reference to FIG. 5 above.

In FIG. 7A, the common electrode of interest can be common electrode 732, which corresponds to updating display pixel 722. Accordingly, the adjusted output of dynamic driving circuit 750 can be predetermined to be acceptable for the RC time constant associated with common electrode 732. In the configuration shown, the RC time constant associated with common electrode 732 can include a relatively large resistance due, in part, to the long conductive path from the common electrode to the dynamic driving circuit 750. In addition, common electrodes associated with an updating display pixel (e.g., common electrode 732) can have a significant load capacitance. Moreover, resistance and/or capacitance from other circuit elements (e.g., common electrodes 731, 733, and 734 also coupled to Vcom) can also contribute to the RC time constant. For these reasons, the RC time constant associated with common electrode 732 can be significant. Other factors can contribute to the RC time constant of a common electrode, for example the number and location of electrodes connected to Vsense, and the number and location of electrodes connected to Vhold. In this example, a feedback resistance $Rfb_1$ can be updated with a value predetermined to provide an acceptable output for the RC time constant associated with common electrode 732 in the configuration shown.

FIG. 7B shows a second block diagram representing a second example configuration 702, in which each common electrode 731-739 is selectively coupled to one or more lines. Like in the configuration shown in FIG. 7A, common electrode 732 can be coupled to Vcom line 718 and correspond to an updating display pixel 722. However, in the configuration shown in FIG. 7B, an additional common electrode 735 is coupled to Vcom line 718 such that five common electrodes 731-735 are coupled to Vcom line 718. In addition, two common electrodes 736-737 can be coupled to Vsense line 719, and two common electrodes 738-739 can be connected to Vhold line 717. In this configuration, the RC time constant associated with common electrode 732 can be different from that in FIG. 7A, as the RC time constant in this case can reflect resistances and capacitances from an additional common electrode 735 coupled to Vcom line 718. Therefore, feedback resistance $Rfb_2$, different from $Rfb_1$, can be adjusted to be a value predetermined to provide an acceptable output for the RC time constant associated with common electrode 732. Thus, the dynamic driving circuit 750 can adjust its output according to an electrode coupling configuration change, even when the LCD update configuration does not change.

FIG. 7C shows a third block diagram representing a third example configuration 703 in which each common electrode 731-739 is selectively coupled to one or more lines. Four common electrodes 734-737 can be coupled to Vcom line 718, two common electrodes 738-739 can be coupled to a Vsense line 719, and three common electrodes 731-733 can be coupled to Vhold line 717. As shown in FIG. 7C, common electrode 735, which is coupled to Vcom line 718, can have a corresponding display pixel 725, which is being updated. In this example, the common electrode of interest can be electrode 735, as corresponding display pixel 725 is being updated. As in the configurations of FIGS. 7A-7B, common electrode 735 can have a significant load capacitance. However, less resistance can be associated with common electrode 735 than with common electrodes 732 of FIGS. 7A-7B due, in part, to the shorter conductive path from common electrode 735 to the dynamic driving circuitry 750. Thus, in some examples, the RC time constant can be less for common electrode 735, which is nearer to the dynamic driving circuitry 750, than for common electrodes 732 of FIGS. 7A-7B. Therefore, feedback resistance $Rfb_3$, different from $Rfb_2$, can be adjusted to be a value predetermined to provide an acceptable output for the RC time constant associated with common electrode 735.

FIG. 7D shows a fourth block diagram representing a fourth example configuration 704 in which each common electrode 731-739 is selectively coupled to one or more lines. Like in the example of FIG. 7C, four common electrodes 734-737 can be coupled to Vcom line 718, two common electrodes 738-739 can be coupled to a Vsense line 719, and three common electrodes 731-733 can be connected to Vhold line 717. However, unlike the configuration shown in FIG. 7C, a different display pixel 726 is being updated, and corresponding common electrode 736 is coupled to Vcom line 718. In other words, while the electrode coupling configuration of FIG. 7C and FIG. 7D can be identical, the LCD updating configuration can be different. In this example, the RC time constant associated with common electrode 736 can be less than that of common electrode 735 in FIG. 7C due, in part, to the shorter conductive path from common electrode 736 to dynamic driving circuitry 750. Therefore, feedback resistance $Rfb_4$, different from $Rfb_3$, can be adjusted to a value predetermined to provide an acceptable output for the RC time constant associated with common electrode 736. Thus, the dynamic driving circuit 750 can adjust its output according to an LCD update configuration change, even when the electrode coupling configuration does not change.

For simplicity, FIGS. 7A-7D illustrate only a portion of a single column of common electrodes and corresponding display pixels; however, the touch screen system can include a plurality of such columns. As shown in FIG. 6B, in some examples, each column of common electrodes can correspond to one or more switching circuits and one or more dynamic driving circuits. It should be noted that an RC time constant can reflect many contributing factors, which are contemplated within the scope of this disclosure; in these examples, only the capacitance and resistance at the driving circuit output are discussed and compared for the sake of illustration. Although the configurations shown in FIGS. 7A-7D illustrate a single display pixel update, it is understood that, in other examples, the LCD updating configuration can be such that a plurality of display pixels can be updated concurrently. It should also be understood that coupling configurations shown in FIGS. 7A-7D are merely examples of possible electrode coupling configurations and LCD updating configurations. A touch screen can include any possible electrode coupling configurations and any possible LCD updating configurations, including configurations not shown. For example, in some examples, common electrodes may be configured to be electrically disconnected from any signals (e.g., floating) or connected to a ground. Moreover, additional lines not shown in FIGS. 7A-7D may be coupled to the common electrodes, including, but not limited to, lines corresponding to a touch detection circuit.

Figure 8:
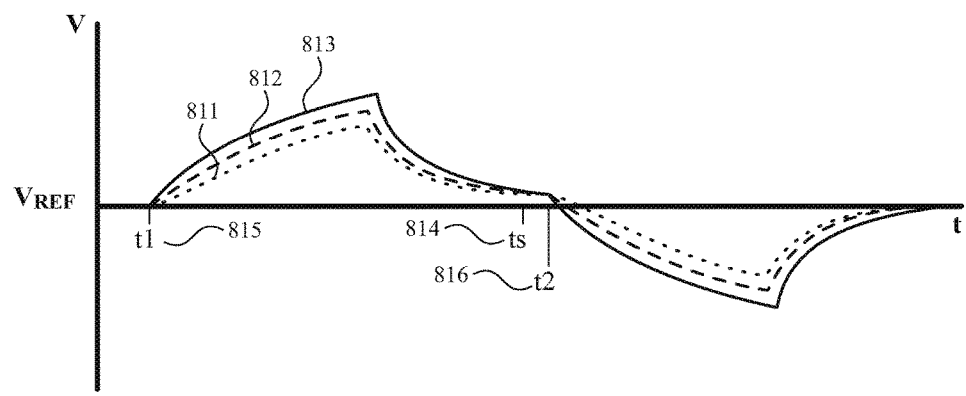
FIG. 8 illustrates an exemplary common electrode voltage plot comparing common electrode voltage settling behavior in a touch screen system having a dynamic driving circuit with a dynamic output according to examples of the disclosure.

Because the output of a dynamic driving circuit can be adjusted for each electrode coupling configuration or LCD updating configuration, the voltage settling can be faster on common electrodes when common electrodes are driven by the dynamic driving circuit as opposed to when driven by a fixed output driving circuit. FIG. 8 shows a voltage timeline which illustrates three cases in which this improvement in settling time can reduce display errors during an LCD display update. FIG. 8 illustrates three exemplary voltage plots 811, 812, and 813 of three example common electrodes in a touch screen system. In each case, a common electrode can be driven by a dynamic driving circuit with a dynamic output (e.g., the dynamic driving circuit 650 of FIG. 6) and each common electrode can have an associated updating display pixel, as will be discussed below. The horizontal axis can represent time, the vertical axis can represent the voltage on a common electrode in each case, and Vref can represent a target voltage for each of the common electrodes.

Voltage plot 811 can correspond, for example, to voltage on a first common electrode near to the driving circuit (e.g., common electrode 635) when an associated first display pixel is updated. Voltage plot 812 can correspond to a second common electrode further from the driving circuit than the common electrode of plot 811 (e.g., common electrode 634) when an associated second display pixel is updated. Likewise, voltage plot 813 can correspond to a common electrode even further from the driving circuit than the common electrode of plot 812 (e.g., common electrode 631) when an associated third display pixel is updated. For the purposes of this example, in each case, the dynamic driving circuit is assumed to have an output individually optimized for the respective common electrode. Although voltage plots 811, 812, and 813 have been superimposed onto one another for convenience of comparison, it should be noted that each voltage plot can, in some cases, represent a separate moment in time (e.g., if the respective display pixels associated with each common electrode are updated separately). Likewise, each of t1, t2 and ts can represent a separate instance in time, though, in every case, each instance of t1 shares the same relationship to t2 and ts, t2 to ts, and so on.

In each case, at a time t1 815, the voltage on a common electrode can be disturbed (e.g., due to capacitive coupling), as illustrated. Despite the range in distance between the common electrodes, in each case, the voltage on a respective common electrode can recover towards Vref relatively quickly, as shown in plots 811, 812, and 813. In each case, at a time t2 816, the voltage on a common electrode can be disturbed for a second time, as illustrated. In the example shown, in each case, the voltage on the common electrode is settled (e.g., less than 5% variation) before the second disturbance. As discussed above with reference to FIG. 4B, an LCD Update Circuit can apply a gate voltage to a gate line of a display pixel and a data voltage to the pixel electrode of the display pixel. The difference in potential between the pixel electrode and common electrode of a display pixel can determine the luminance of display pixel. In each case, a time ts 814 can represent a "set" time, wherein the LCD Update Circuitry can set a voltage on the data line of a display pixel associated with the respective common electrode. As shown, the settling time in each of the plots 811, 812, and 813 is fast enough that the voltage at a corresponding common electrode is essentially at the target voltage, Vref, when the data value, and thus luminance, of the display pixel is set. Thus, in each case, the luminance of an updated display pixel is more likely to be accurate, and the touch screen is less likely to have display errors.

The examples above are focused on improving voltage settling time using a dynamic driving circuit wherein the adjustable output is gain. However, other adjustable outputs are within the scope of this disclosure. As shown in FIG. 6C, a dynamic driving circuit can include an adjustable slew rate. In these examples, the dynamic driving circuit can be designed such that the slew rate is adjustable to achieve the reduced settling times discussed above, and thus, reduce display errors as similarly described with reference to FIG. 9.

As illustrated by the examples in FIG. 7A-7D, the output of dynamic driving circuit 750 can change based on the electrode coupling configuration and/or the LCD updating configuration. As discussed, it can be useful to characterize these configurations in terms of the RC time constant associated with the common electrode of interest (e.g., a common electrode associated with an updating display pixel). In some cases, one or more dynamic values (e.g., resistance values in the dynamic driving circuit) can determine the dynamic output. Possible dynamic values for the dynamic driving circuit can be predetermined by simulating possible circuit configurations, including electrode coupling configurations and LCD updating configurations. For each possible configuration, a RC time constant can be estimated, and a dynamic value can be selected which will provide an acceptable output in view of the RC time constant. In some cases, the number of possible dynamic output values of a dynamic driving circuit will equal the number of common electrodes associated with the driving circuit. In other examples, the number of possible dynamic output values may exceed the amount of common electrodes associated with the dynamic driving circuit. For example, if each common electrode can be associated with multiple configurations, each configuration can be associated with a separate dynamic value, and thus, dynamic output. In other examples, the number of possible dynamic values may be less than the amount of common electrodes associated with the dynamic driving circuit. For example, if two common electrodes are associated with similar RC time constants, then a single dynamic variable can produce an acceptable dynamic output for both common electrodes.

In some examples, acceptable dynamic values (e.g., acceptable resistor values), and by extension, acceptable dynamic outputs, can be chosen based on a number of factors, including, but not limited to: the number of common electrodes being driven by the dynamic driving circuit (e.g., connected to Vcom), the location of the common electrodes being driven by the dynamic driving circuit, the number of common electrodes connected to the dynamic driving circuit feedback (e.g., connected to Vsense), the location of the common electrodes coupled to the dynamic driving circuit feedback, the number of common electrodes coupled to Vhold, the number of display pixels being updated by an LCD Update Circuit, and the location of the common electrodes corresponding to these updating display pixels. In some examples, each dynamic value can be updated only when the electrode coupling configuration changes; in other examples, each dynamic value can be updated only when the LCD update configuration changes.

In some examples, a touch screen can scan a column (or row) of display pixels in time steps according to a scan pattern. In some cases, each time step within a scan pattern can have a corresponding LCD update configuration, a corresponding electrode coupling configuration, and a corresponding dynamic value. In some configurations, the amount of time steps within each scan pattern can be equal to the number of common electrodes associated with a controller. In some configurations, a first time step can apply to updating a first display pixel, a second time step can apply to updating a second display pixel, and so on. In some examples, a touch screen can use multiple scan patterns. In these cases, each common electrode can be associated with a plurality of dynamic values from the dynamic driving circuit. For example, if the electrode coupling configuration in a first time step of a first pattern is different than the electrode coupling configuration in a first time step of a second pattern, then one common electrode (associated with the first step) can be associated with two different RC time constants. Accordingly, the dynamic driving circuit can apply two different dynamic values for the same common electrode. In some configurations, each time step is advanced according to one or more timing signals 661 received from the timing interface 614 as shown in FIG. 7.

Referring back to FIG. 6, in some examples, the dynamic driving circuit 650 can retrieve driving circuit output information, (e.g., information about dynamic values Rfb and/or Rin) from a memory (e.g., RAM 612). The information retrieved from RAM 612 can be, for example, a signal representing a resistance value, or in the example of a resistive network with a switching network, a signal indicating which of the resistors to couple in line with the feedback or input line. This driving circuit output information retrieved by the dynamic driving circuit 650 from RAM 612 can be updated each time the electrode coupling configuration changes, each time the LCD Update Circuitry configuration changes, or according to a timing signal as discussed above. In some examples, the information can be pushed to RAM 612 using, for example, the driving control circuit 608. In some examples, driving control circuit 608 can include a shift register configured to push the information to RAM 612. In some configurations, the driving control circuit 608 can include a lookup table (LUT) which can include a number of dynamic values. In some examples, the number of dynamic values stored in the driving control circuit lookup table can exceed the number of common electrodes associated with controller 604. In some examples, driving control circuit 608 can receive instructions as to which dynamic values to push to RAM 612 from a processor. Further, in some configurations, non-linear or linear interpolation techniques can be utilized to approximate gain and bias settings based on existing dynamic values stored in RAM in order to reduce memory requirements.

The switching control circuit 665 can be logic and also configured to retrieve common electrode coupling information from RAM 612. In some examples, this information can correspond to electrode coupling configurations. In some cases, the common electrode coupling information obtained by switching control circuit 665 can correspond to dynamic values retrieved by the dynamic driving circuit 650 or driving circuit output information received by the driving controller circuit 608. A timing interface 614 can be included in the controller to perform various timing operations, for example, synchronizing the operation of the switching control circuits 665 and driving control circuits 608. In some examples, both the dynamic driving circuit 650 and the switching circuit 637 can operate according to timing instructions received through the timing interface 614, where the instructions originate from a processor off of the controller 604 (e.g., host processor 228 in FIG. 2). The timing of the dynamic driving circuit 650 and switching circuit 637 is discussed in more detail with reference to FIG. 9 below.

Figure 9:
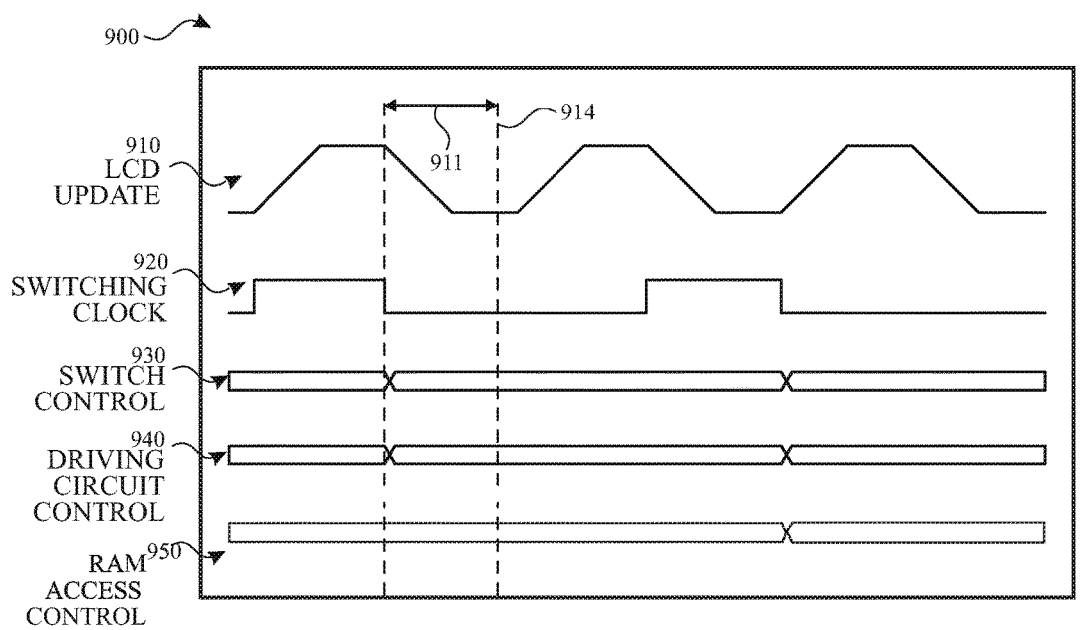
FIG. 9 illustrates a timing diagram for adjusting the output of a dynamic driving circuit in a touch screen according to examples of the disclosure.

FIG. 9 illustrates an exemplary timing diagram 900 for adjusting the output of a dynamic driving circuit in a touch screen according to examples of the disclosure. The timing diagram 900 illustrates an LCD update controller signal 910, a switching clock 920, a switching circuit control signal 930, and a driving circuit control signal 940. The LCD update controller signal 910 can include one or more sampling intervals 911, and a set time 914 for each sampling interval 911. The sampling interval 911 can correspond to a time in which an LCD Update Circuit updates one or more display pixels. The set time 914 indicates the end of sampling interval 911 wherein the display luminance of a display pixel is set. For example, set time 914 can be analogous to the set time is 814 as discussed with reference to FIG. 8 above. As also discussed with reference to FIG. 8 above, in order to minimize display errors, it can be important to ensure that the voltage on a common electrode is settled before setting the luminance of an associated display pixel. Accordingly, in some examples, the output of the dynamic driving circuit (e.g., controlled by driving circuit control signal 940) can be set at the beginning of a sampling interval 911 such that the dynamic driving circuit can have time to adjust and the driven common electrode can have time to settle towards the target voltage before the set time 914. In some examples, the configuration of a switching circuit (e.g., switching circuit control signal 930) can also be updated at the beginning of a sample interval 911. In some configurations, a RAM access control signal 950 (corresponding, for example, to a control signal for RAM 612 shown in FIG. 6A) can be set according to one or more of the other signals shown in FIG. 10. For example, the falling edges of switching clock 920 may trigger a change to switch control 930, driving circuit control 940, and/or RAM access control 950. However, as shown with respect to RAM access control signal 950, a falling edge of switching clock 920 need not register a change in any of these signals (for example, when RAM access control does not need to access additional data). It should be understood that the timing diagram 900 is only one example of a timing configuration; in other examples, the timing of dynamic driving circuit update may be different. For example, updates to the dynamic driving circuit can occur asynchronously. Moreover, in some examples, updates to the dynamic driving circuit can occur during periods where display pixels are not being updated, for example, before or during a touch phase of the touch screen.

Thus, the examples of the disclosure provide various dynamic driving circuit configurations for adjusting the output of a driving circuit according to the resistive and capacitive load present at the driving circuit, thereby reducing the settling time of a voltage on common electrodes and increasing touch screen display performance.

Therefore, according to the above, some examples of the disclosure are directed to a switching circuit comprising: a first drive circuitry having an output line and an adjustable output, the first drive circuitry configured to drive one or more common electrodes of a plurality of common electrodes of a display, the display including a plurality of display pixels, each of the plurality of display pixels associated with one of the plurality of common electrodes; and logic configured to: when a first display pixel of the plurality of display pixels is being updated by display circuitry, selectively couple a first set of common electrodes of the plurality of common electrodes to the output line of the first drive circuitry, wherein the first set of common electrodes includes a first common electrode associated with the first display pixel; and set the output of the first drive circuitry based on: a number of common electrodes in the first set of common electrodes, and a location of the first display pixel on the display. Additionally or alternatively to one or more of the examples disclosed above, in some examples, the first drive circuitry further includes an input line; and the logic is further configured to: selectively couple a second set of common electrodes of the plurality of common electrodes to the input line of the first drive circuitry concurrent with coupling the first set of common electrodes of the plurality of common electrodes to the output line of the first drive circuitry; and set the output of the first drive circuitry based on a number of common electrodes in the second set of common electrodes. Additionally or alternatively to one or more of the examples disclosed above, in some examples, setting the output of the first drive circuitry includes changing a slew rate of the first drive circuitry. Additionally or alternatively to one or more of the examples disclosed above, in some examples, the first drive circuitry includes: an operational amplifier having an input terminal and an output terminal, the output terminal coupled to the output line of the first drive circuitry, and the logic is further configured to set a gain bandwidth of the operational amplifier based on a number of common electrodes in the second set of common electrodes. Additionally or alternatively to one or more of the examples disclosed above, in some examples—the gain bandwidth of the operational amplifier is set by setting a bias current of the operational amplifier. Additionally or alternatively to one or more of the examples disclosed above, in some examples, setting the output of the first drive circuitry includes changing a gain of the first drive circuitry. Additionally or alternatively to one or more of the examples disclosed above, in some examples, the first drive circuitry includes: an operational amplifier having an input terminal and an output terminal, the output terminal coupled to the output line of the first drive circuitry, and an adjustable capacitor having a feedback capacitance connected between the output terminal and the input terminal; and the logic is further configured to set the output of the first drive circuitry by adjusting the feedback capacitance. Additionally or alternatively to one or more of the examples disclosed above, in some examples, the first drive circuitry includes: an operational amplifier having an input terminal and an output terminal, the output terminal coupled to the output line of the first drive circuitry, and an adjustable feedback resistor having a feedback resistance connected between the output terminal and the input terminal; and the logic is further configured to set the output of the first drive circuitry by adjusting the feedback resistance. Additionally or alternatively to one or more of the examples disclosed above, in some examples, the first drive circuitry includes: an operational amplifier having an input terminal and an output terminal, the output terminal coupled to the output line of the first drive circuitry, and an adjustable input resistor having an input resistance connected in series with the input terminal; and the logic is further configured to set the output of the first drive circuitry by adjusting the input resistance. Additionally or alternatively to one or more of the examples disclosed above, in some examples, the first set of common electrodes further includes a second common electrode; and the logic is further configured to: set the output of the first drive circuitry to have a first value when the first common electrode is coupled to the first drive circuitry; set the output of the first drive circuitry to have a second value, different from the first value, when the second common electrode is coupled to the first drive circuitry. Additionally or alternatively to one or more of the examples disclosed above, in some examples, the first set of common electrodes further includes a second common electrode associated with a second display pixel; and the logic is further configured to, while the first set of common electrodes remains coupled to the output line of the first drive circuitry: set the output of the first drive circuitry to have a first value when the first display pixel is being updated by display circuitry; and set the output of the first drive circuitry to have a second value, different from the first value, when the second display pixel is being updated by the display circuitry. Additionally or alternatively to one or more of the examples disclosed above, in some examples, the logic is further configured to: when the first display pixel of the plurality of display pixels is being updated for a first time by the display circuitry, set the output of the first drive circuitry to have a first value; and when the first display pixel of the plurality of display pixels is being updated for a second time, after the first time, by the display circuitry, set the output of the first drive circuitry to have a second value, different from the first value. Additionally or alternatively to one or more of the examples disclosed above, in some examples, the display comprises part of a touch screen, the touch screen configured to operate in a touch sensing phase and a display phase, and the logic is configured to set the output of the first drive circuitry during the touch sensing phase. Additionally or alternatively to one or more of the examples disclosed above, in some examples, the display comprises part of a touch screen, and the touch screen comprises a pixelated self-capacitance touch sensor panel, and the first common electrode comprises a pixelated self-capacitance common electrode. Additionally or alternatively to one or more of the examples disclosed above, in some examples, the first drive circuitry and the logic are each formed on a same integrated circuit (IC). Additionally or alternatively to one or more of the examples disclosed above, in some examples, the switching circuit further comprises: a second drive circuitry having a second output line different from the output line and a second adjustable output different from the adjustable output, the second drive circuitry configured to drive one or more common electrodes of a second plurality of common electrodes of the display, the display including a second plurality of display pixels, each of the second plurality of display pixels is associated with one of the second plurality of common electrodes; wherein the logic is further configured to: when a second display pixel of the second plurality of display pixels is being updated by display circuitry, selectively couple a second set of common electrodes of the second plurality of common electrodes to the second output line of the second drive circuitry, wherein the second set of common electrodes of the second plurality of common electrodes includes a second common electrode associated with the second display pixel; and set the output of the second drive circuitry based on: a number of common electrodes in the second set of common electrodes, and a location of the second display pixel on the display.

Some examples of the disclosure are directed to a switching circuit comprising: a first drive circuitry having an adjustable output, the first drive circuitry configured to drive one or more common electrodes of a plurality of common electrodes of a display, the display including a plurality of display pixels, each of the plurality of display pixels associated with one of the plurality of common electrodes; memory configured to store common electrode coupling information and drive circuitry output information; and logic configured to: receive the common electrode coupling information and the first drive circuitry output information from the memory; selectively couple a set of common electrodes of the plurality of common electrodes to the output line of the first drive circuitry in accordance with the common electrode coupling information; and set the output of the first drive circuitry in accordance with the first drive circuitry output information. Additionally or alternatively to one or more of the examples disclosed above, in some examples, the memory is further configured to store input bias current information, and the logic is further configured to receive the input bias current information from the memory and set the output of the first drive circuitry in accordance with the input bias current information. Additionally or alternatively to one or more of the examples disclosed above, in some examples, the logic is further configured to receive the input bias current information from the memory and set the output of the first drive circuitry according to an interpolation of a plurality of values from the first drive circuitry output information. Additionally or alternatively to one or more of the examples disclosed above, in some examples, the first drive circuitry output information includes a first drive circuitry value and a second drive circuitry value; and the logic is configured to: at a first time, retrieve the first drive circuitry value from the memory and set the output of the first drive circuitry in accordance with the first drive circuitry value; and at a second time, retrieve the second drive circuitry value from the memory and set the output of the first drive circuitry in accordance with the second drive circuitry value. Additionally or alternatively to one or more of the examples disclosed above, in some examples, the logic includes a drive control circuitry and a switch control circuitry; and the switching circuit further comprises a timing interface configured to transmit control signals to the drive control circuitry and the switch control circuitry. Additionally or alternatively to one or more of the examples disclosed above, in some examples: the common electrode coupling information includes a first common electrode coupling configuration; the first drive circuitry output information includes a first drive circuitry value; the drive control circuitry is configured to receive the first drive circuitry value according to a first control signal from the timing interface, and set the output of the first drive circuitry according to the first drive circuitry value; and the switch control circuitry is configured to receive the first common electrode coupling configuration according to the first control signal from the timing interface, and selectively couple one or more common electrodes to the first drive circuitry according to the first common electrode coupling configuration. Additionally or alternatively to one or more of the examples disclosed above, the switching circuit further comprising: a second drive circuitry having a second adjustable output different from the adjustable output, the second drive circuitry configured to drive one or more common electrodes of a second plurality of common electrodes of the display different from the plurality of common electrodes; wherein the memory is further configured to store second common electrode coupling information and second drive circuitry output information; and the logic is further configured to: receive the second common electrode coupling information and the second drive circuitry output information from the memory; selectively couple a second set of common electrodes of the second plurality of common electrodes to the second output line of the second drive circuitry in accordance with the second common electrode coupling information; and set the output of the second drive circuitry in accordance with the second drive circuitry output information.

Some examples of the disclosure are directed to a method comprising: selectively coupling a first set of common electrodes of a plurality of common electrodes of a display to an output line of a first drive circuitry having an adjustable output, wherein the first set of common electrodes includes a first common electrode; while the first set of common electrodes is selectively coupled to the output line of the first drive circuitry, updating a first display pixel of a plurality of display pixels of the display using display circuitry, wherein the first display pixel is associated with the first common electrode; and while updating the first display pixel, setting the output of the first drive circuitry based on: a number of electrodes in the first set of common electrodes, and a location of the first display pixel on the display. Additionally or alternatively to one or more of the examples disclosed above, in some examples, the method further comprises: selectively coupling a second set of common electrodes of the plurality of common electrodes to an input of the first drive circuitry concurrent with selectively coupling the first set of common electrodes to the output line of the first drive circuitry, wherein setting the output of the first drive circuitry is further based on a number of common electrodes in the second set of common electrodes. Additionally or alternatively to one or more of the examples disclosed above, in some examples, setting the output of the first drive circuitry includes changing a slew rate of the first drive circuitry. Additionally or alternatively to one or more of the examples disclosed above, in some examples, setting the output of the first drive circuitry includes changing a gain of the first drive circuitry. Additionally or alternatively to one or more of the examples disclosed above, in some examples, the first drive circuitry includes an operational amplifier having an input terminal and an output terminal, the output terminal coupled to the output line of the first drive circuitry, and an adjustable feedback resistor connected between the output terminal and the input terminal, and wherein: changing the gain of the first drive circuitry includes changing a value of an adjustable feedback resistor. Additionally or alternatively to one or more of the examples disclosed above, in some examples, the first drive circuitry includes an operational amplifier having an input terminal and an output terminal, and the adjustable input resistor is connected in series with the input terminal, and wherein: changing the gain of the first drive circuitry includes changing a value of an adjustable input resistor. Additionally or alternatively to one or more of the examples disclosed above, in some examples, the method further comprises: while the first set of common electrodes is selectively coupled to the output line of the first drive circuitry, updating the first display pixel for a first time; while updating the first display pixel for the first time, setting the output of the first drive circuitry to have a first value; subsequent to updating the first display pixel for the first time, selectively coupling a second common electrode to the first drive circuitry output line; while the first set of common electrodes and the second common electrode are coupled to the first drive circuitry output line, updating the first display pixel for a second time; and while updating the first display pixel for the second time, setting the output of the first drive circuitry to have a second value, different from the first value.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A switching circuit comprising:
   a first drive circuitry having an output line and configured to output, on the output line, an adjustable output signal, the first drive circuitry configured to drive, via the output line, one or more common electrodes of a plurality of common electrodes of a display, the display including a plurality of display pixels, each of the plurality of display pixels associated with one of the plurality of common electrodes; and
   logic configured to:
      in accordance with a determination that a first display pixel of the plurality of display pixels is being updated by display circuitry, selectively couple a first set of common electrodes of the plurality of common electrodes to the output line of the first drive circuitry, wherein the first set of common electrodes includes a first common electrode associated with the first display pixel; and
      set the adjustable output signal of the first drive circuitry as a function of:
         a number of common electrodes in the first set of common electrodes, and
         a location of the first display pixel on the display.

2. The switching circuit of claim 1, wherein:
   the first drive circuitry further includes an input line; and
   the logic is further configured to:
      selectively couple a second set of common electrodes of the plurality of common electrodes to the input line of the first drive circuitry concurrent with coupling the first set of common electrodes of the plurality of common electrodes to the output line of the first drive circuitry; and
      set the adjustable output signal of the first drive circuitry as a function of a number of common electrodes in the second set of common electrodes.

3. The switching circuit of claim 1, wherein:
   setting the adjustable output signal of the first drive circuitry includes changing a slew rate of the first drive circuitry.

4. The switching circuit of claim 1, wherein:
   the first drive circuitry includes:
      an operational amplifier having an input terminal and an output terminal, the output terminal coupled to the output line of the first drive circuitry, and
   the logic is further configured to set a gain bandwidth of the operational amplifier as a function of a number of common electrodes in the first set of common electrodes.

5. The switching circuit of claim 4, wherein, the gain bandwidth of the operational amplifier is set by setting a bias current of the operational amplifier.

6. The switching circuit of claim 1, wherein:
   setting the adjustable output signal of the first drive circuitry includes changing a gain of the first drive circuitry.

7. The switching circuit of claim 6, wherein:
   the first drive circuitry includes:
      an operational amplifier having an input terminal and an output terminal, the output terminal coupled to the output line of the first drive circuitry, and
      an adjustable capacitor having a feedback capacitance connected between the output terminal and the input terminal; and
   the logic is further configured to set the adjustable output signal of the first drive circuitry by adjusting the feedback capacitance.

8. The switching circuit of claim 6, wherein:
the first drive circuitry includes:
an operational amplifier having an input terminal and an output terminal, the output terminal coupled to the output line of the first drive circuitry, and
an adjustable feedback resistor having a feedback resistance connected between the output terminal and the input terminal; and
the logic is further configured to set the adjustable output signal of the first drive circuitry by adjusting the feedback resistance.

9. The switching circuit of claim 6, wherein:
the first drive circuitry includes:
an operational amplifier having an input terminal and an output terminal, the output terminal coupled to the output line of the first drive circuitry, and
an adjustable input resistor having an input resistance connected in series with the input terminal; and
the logic is further configured to set the adjustable output signal of the first drive circuitry by adjusting the input resistance.

10. The switching circuit of claim 1, wherein:
the first set of common electrodes further includes a second common electrode; and
the logic is further configured to:
set the adjustable output signal of the first drive circuitry to have a first value when the first common electrode is coupled to the first drive circuitry;
set the adjustable output signal of the first drive circuitry to have a second value, different from the first value, when the second common electrode is coupled to the first drive circuitry.

11. The switching circuit of claim 1, wherein:
the first set of common electrodes further includes a second common electrode associated with a second display pixel; and
the logic is further configured to, while the first set of common electrodes remains coupled to the output line of the first drive circuitry:
set the adjustable output signal of the first drive circuitry to have a first value when the first display pixel is being updated by display circuitry; and
set the adjustable output signal of the first drive circuitry to have a second value, different from the first value, when the second display pixel is being updated by the display circuitry.

12. The switching circuit of claim 1, wherein the logic is further configured to:
in accordance with a determination that the first display pixel of the plurality of display pixels is being updated for a first time by the display circuitry, set the adjustable output signal of the first drive circuitry to have a first value; and
in accordance with a determination that the first display pixel of the plurality of display pixels is being updated for a second time, after the first time, by the display circuitry, set the adjustable output signal of the first drive circuitry to have a second value, different from the first value.

13. The switching circuit of claim 1, wherein:
the display comprises part of a touch screen, the touch screen configured to operate in a touch sensing phase and a display phase, and
the logic is configured to set the adjustable output signal of the first drive circuitry during the touch sensing phase.

14. The switching circuit of claim 1, wherein:
the display comprises part of a touch screen, and the touch screen comprises a pixelated self-capacitance touch sensor panel, and
the first common electrode comprises a pixelated self-capacitance common electrode.

15. The switching circuit of claim 1, wherein:
the first drive circuitry and the logic are each formed on a same integrated circuit (IC).

16. The switching circuit of claim 1, further comprising:
a second drive circuitry having a second output line different from the output line and configured to output, on the second output line, a second adjustable output signal different from the adjustable output signal, the second drive circuitry configured to drive one or more common electrodes of a second plurality of common electrodes of the display, the display including a second plurality of display pixels, each of the second plurality of display pixels is associated with one of the second plurality of common electrodes;
wherein the logic is further configured to:
in accordance with a determination that a second display pixel of the second plurality of display pixels is being updated by display circuitry, selectively couple a second set of common electrodes of the second plurality of common electrodes to the second output line of the second drive circuitry, wherein the second set of common electrodes of the second plurality of common electrodes includes a second common electrode associated with the second display pixel; and
set the second adjustable output signal of the second drive circuitry as a function of:
a number of common electrodes in the second set of common electrodes, and
a location of the second display pixel on the display.

17. A method comprising:
selectively coupling a first set of common electrodes of a plurality of common electrodes of a display to an output line of a first drive circuitry configured to output, on the output line an adjustable output signal, wherein the first set of common electrodes includes a first common electrode;
while the first set of common electrodes is selectively coupled to the output line of the first drive circuitry, updating a first display pixel of a plurality of display pixels of the display using display circuitry, wherein the first display pixel is associated with the first common electrode; and
in accordance with a determination that the display circuitry is updating the first display pixel of the plurality of display pixels, setting the adjustable output signal of the first drive circuitry as a function of:
a number of electrodes in the first set of common electrodes, and
a location of the first display pixel on the display.

18. The method of claim 17, further comprising:
selectively coupling a second set of common electrodes of the plurality of common electrodes to an input of the first drive circuitry concurrent with selectively coupling the first set of common electrodes to the output line of the first drive circuitry,
wherein setting the adjustable output signal of the first drive circuitry is further a function of a number of common electrodes in the second set of common electrodes.

19. The method of claim 17, wherein:
setting the adjustable output signal of the first drive circuitry includes changing a slew rate of the first drive circuitry.

20. The method of claim 17, wherein:
setting the adjustable output signal of the first drive circuitry includes changing a gain of the first drive circuitry.

21. The method of claim 20, wherein the first drive circuitry includes an operational amplifier having an input terminal and an output terminal, the output terminal coupled to the output line of the first drive circuitry, and an adjustable feedback resistor connected between the output terminal and the input terminal, and wherein:
changing the gain of the first drive circuitry includes changing a value of the adjustable feedback resistor.

22. The method of claim 20, wherein the first drive circuitry includes an operational amplifier having an input terminal and an output terminal, and an adjustable input resistor is connected in series with the input terminal, and wherein:
changing the gain of the first drive circuitry includes changing a value of the adjustable input resistor.

23. The method of claim 17, further comprising:
while the first set of common electrodes is selectively coupled to the output line of the first drive circuitry, updating the first display pixel for a first time;
in accordance with a determination that the display circuitry is updating the first display pixel for the first time, setting the adjustable output signal of the first drive circuitry to have a first value;
subsequent to updating the first display pixel for the first time, selectively coupling a second common electrode to the first drive circuitry output line;
while the first set of common electrodes and the second common electrode are coupled to the first drive circuitry output line, updating the first display pixel for a second time; and
in accordance with a determination that the display circuitry is updating the first display pixel for the second time, setting the adjustable output signal of the first drive circuitry to have a second value, different from the first value.

* * * * *